(12) United States Patent
Banerjee et al.

(10) Patent No.: US 12,107,770 B2
(45) Date of Patent: *Oct. 1, 2024

(54) COMPUTE EXPRESS LINK OVER ETHERNET IN COMPOSABLE DATA CENTERS

(71) Applicant: Cisco Technology, Inc., San Jose, CA (US)

(72) Inventors: Ayan Banerjee, Fremont, CA (US); Ramesh Sivakolundu, Saratoga, CA (US); Chakradhar Kar, San Jose, CA (US); Sagar Borikar, San Jose, CA (US); Anant Thakar, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,015

(22) Filed: Mar. 15, 2023

(65) Prior Publication Data

US 2023/0224255 A1    Jul. 13, 2023

Related U.S. Application Data

(63) Continuation of application No. 17/751,210, filed on May 23, 2022, now Pat. No. 11,632,337.

(Continued)

(51) Int. Cl.
*H04L 47/72* (2022.01)
*G06F 3/06* (2006.01)
(Continued)

(52) U.S. Cl.
CPC ............ *H04L 47/72* (2013.01); *G06F 3/0601* (2013.01); *G06F 9/50* (2013.01); *H04L 47/722* (2013.01);
(Continued)

(58) Field of Classification Search
CPC ..... H04L 47/72; H04L 47/722; H04L 47/822; H04L 47/829; H04L 67/141;
(Continued)

(56) References Cited

U.S. PATENT DOCUMENTS 6,128,644 A * 10/2000 Nozaki ................... G06F 9/505
709/227
6,829,638 B1 * 12/2004 McBrearty .......... H04L 67/1008
709/219

(Continued)

OTHER PUBLICATIONS

Wagh et al, "Compute express link (CXL) 2.0 Specification: Memory Pooling—Questions, Part 1", date May 21, 21, https://www.computeexpresslink.org/post/compute-express-link-cxl-2-0-specification-memory-pooling-questions-from-the-webinar-part-1 (Year: 2021).*

(Continued)

*Primary Examiner* — Ramy M Osman
(74) *Attorney, Agent, or Firm* — Lee & Hayes, P.C.

(57) ABSTRACT

Techniques for sending Compute Express Link (CXL) packets over Ethernet (CXL-E) in a composable data center that may include disaggregated, composable servers. The techniques may include receiving, from a first server device, a request to bind the first server device with a multiple logical device (MLD) appliance. Based at least in part on the request, a first CXL-E connection may be established for the first server device to export a computing resource to the MLD appliance. The techniques may also include receiving, from the MLD appliance, an indication that the computing resource is available, and receiving, from a second server device, a second request for the computing resource. Based at least in part on the second request, a second CXL-E connection may be established for the second server device to consume or otherwise utilize the computing resource of the first server device via the MLD appliance.

20 Claims, 12 Drawing Sheets

Related U.S. Application Data

(60) Provisional application No. 63/254,335, filed on Oct. 11, 2021, provisional application No. 63/254,341, filed on Oct. 11, 2021, provisional application No. 63/254,365, filed on Oct. 11, 2021, provisional application No. 63/254,375, filed on Oct. 11, 2021, provisional application No. 63/254,398, filed on Oct. 11, 2021, provisional application No. 63/254,367, filed on Oct. 11, 2021, provisional application No. 63/254,381, filed on Oct. 11, 2021.

(51) Int. Cl.
- G06F 9/50 (2006.01)
- H04L 47/70 (2022.01)
- H04L 47/722 (2022.01)
- H04L 67/141 (2022.01)
- H04L 67/568 (2022.01)
- H04L 69/08 (2022.01)

(52) U.S. Cl.
CPC .......... *H04L 47/822* (2013.01); *H04L 47/829* (2013.01); *H04L 67/141* (2013.01); *H04L 67/568* (2022.05); *H04L 69/08* (2013.01)

(58) Field of Classification Search
CPC ....... H04L 67/568; H04L 69/08; H04L 69/24; G06F 3/0601; G06F 9/50
See application file for complete search history.

(56) References Cited

U.S. PATENT DOCUMENTS

| | | | |
|---|---|---|---|
| 10,296,750 B1 | 5/2019 | Rossman | |
| 11,388,268 B1 | 7/2022 | Siva | |
| 11,461,263 B2 | 10/2022 | Malladi | |
| 11,632,337 B1* | 4/2023 | Banerjee | H04L 67/568 709/226 |
| 2002/0166033 A1* | 11/2002 | Kagami | G06F 9/5016 711/148 |
| 2003/0182425 A1* | 9/2003 | Kurakake | H04L 67/1001 718/104 |
| 2005/0160276 A1* | 7/2005 | Braun | H04L 63/10 713/185 |
| 2006/0206891 A1* | 9/2006 | Armstrong | G06F 9/45537 718/1 |
| 2008/0317238 A1* | 12/2008 | Cai | H04L 67/125 379/220.01 |
| 2014/0164690 A1 | 6/2014 | De et al. | |
| 2015/0256481 A1* | 9/2015 | Turovsky | H04L 47/83 709/226 |
| 2020/0104275 A1 | 4/2020 | Sen | |
| 2020/0142822 A1 | 5/2020 | Dawson et al. | |
| 2020/0322233 A1 | 10/2020 | Gao et al. | |
| 2020/0328879 A1 | 10/2020 | Makaram | |
| 2020/0394150 A1 | 12/2020 | Lanka | |
| 2021/0117244 A1 | 4/2021 | Herdrich | |
| 2021/0311900 A1 | 10/2021 | Malladi | |
| 2021/0373951 A1 | 12/2021 | Malladi | |
| 2022/0147476 A1 | 5/2022 | Nam | |
| 2022/0263913 A1 | 8/2022 | Zhang | |
| 2023/0116820 A1* | 4/2023 | Banerjee | H04L 47/829 709/226 |
| 2023/0188474 A1* | 6/2023 | Kar | H04L 47/72 709/226 |
| 2023/0224255 A1* | 7/2023 | Banerjee | H04L 47/822 709/226 |

OTHER PUBLICATIONS

Wagh et al, "Compute express link (CXL) 2.0 Specification: Memory Pooling—Questions, Part 2", date May 21, 21, https://www.computeexpresslink.org/post/compute-express-link-cxl-2-0-specification-memory-pooling-questions-from-the-webinar-part-2 (Year: 2021).*

Mann, Tobias, "Compute Express Link Eyes Hardware Push in 2021", date Nov. 27, 19, https://www.sdxcentral.com/articles/news/compute-express-link-eyes-hardware-push-in-2021/2019/11/ (Year: 2019).*

Danesh, et al., "Questions from the Webinar: Introducing the Compute Express Lin·X· 2.0 Specification" retrieved on Nov. 29, 2022 at «https://www .computeexpressl ink. org/post/q uestions- from-the-webi nar -introd uci ng-the-compute- express-l in k-2-0-specification», CXL Consoritum, Jan. 27, 2021, pp. 1-2.

Das Sharma, et al., "Compute Express Link 2.0 White Paper", Nov. 2020, CXL, 2020, 4 pgs.

Hilson, "CXL Protocol Adds Capabilities over PCIe", May 18, 2020, EE Times, 2020, 6 pgs.

Lender, "Compute Express Link (CXL): A Coherent Interface for Ultra-High-Speed Transfers", Jul. 2020, CXL Consortium, 2020 pp. 1-25.

The Register, "Compute Express Link glue that binds processors and accelerators hits spec version 2.0 . . . so, uh, rejoice?", retrieved from «https://forums.theregister.com/forum/all/2020/11/10/compute_express_link_spec_hits/» on Nov. 10, 2020, 2 pages.

* cited by examiner

COMPUTE EXPRESS LINK OVER ETHERNET IN COMPOSABLE DATA CENTERS

RELATED APPLICATIONS

This application is a continuation of and claims priority to U.S. patent application Ser. No. 17/751,210, filed May 23, 2022, which claims priority to U.S. Provisional Patent Application No. 63/254,335, filed Oct. 11, 2021, and to U.S. Provisional Patent Application No. 63/254,341, filed Oct. 11, 2021, and to U.S. Provisional Patent Application No. 63/254,365, filed Oct. 11, 2021, and to U.S. Provisional Patent Application No. 63/254,375, filed Oct. 11, 2021, and to U.S. Provisional Patent Application No. 63/254,398, filed Oct. 11, 2021, and to U.S. Provisional Patent Application No. 63/254,367, filed Oct. 11, 2021, and to U.S. Provisional Patent Application No. 63/254,381, filed Oct. 11, 2021, which applications are incorporated herein by reference in their entirety and for all purposes.

TECHNICAL FIELD

The present disclosure relates generally to techniques for establishing Compute Express Link (CXL) communication connections over ethernet-based fabrics in data centers.

BACKGROUND

Disaggregated composable servers in data centers are becoming a reality due to the introduction of Compute Express Link (CXL) technologies in the processor complex. Among other things, CXL-based fabrics enable disaggregated composable servers in data centers to share resources between hosts and servers/targets offering resources. Although CXL-based fabrics offer many advantages, several challenges still remain to be solved to enable disaggregated composable servers in data centers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
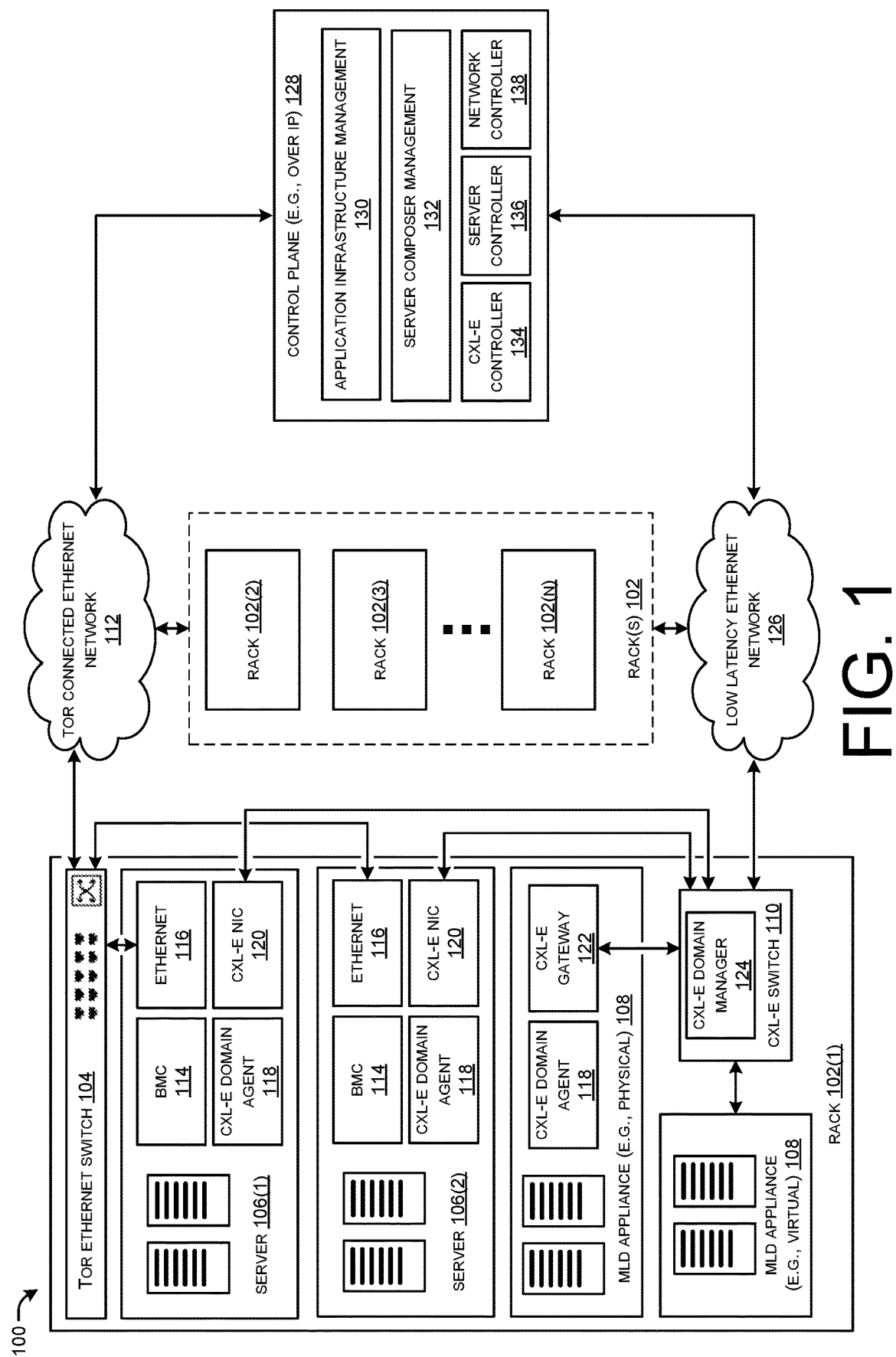
FIG. 1 illustrates an example architecture that may be used to implement various aspects of the technologies described herein.

This disclosure describes various technologies associated with establishing Compute Express Link (CXL) communication connections over ethernet-based fabrics in data centers. By way of example, and not limitation, a method according to the various techniques disclosed for establishing communication connections in which CXL protocol packets are sent between computing devices of a composable data center over an ethernet protocol may include receiving, from a first server device of the composable data center, a first request to bind the first server device with a multiple logical device (MLD) appliance. In some examples, based at least in part on the first request, a first communication connection of the communication connections may be established such that the first server device exports a computing resource to the MLD appliance. In some examples, the method may include receiving, from the MLD appliance, an indication that the computing resource is available. The method may also include receiving, from a second server device of the composable data center, a second request for the computing resource. Based at least in part on the second request, the method may include establishing a second communication connection of the communication connections such that the second server device utilizes the computing resource available on the MLD appliance.

Additionally, the techniques described herein may be performed as a method and/or by a system having non-transitory computer-readable media storing computer-executable instructions that, when executed by one or more processors, performs the techniques described above.

Example Embodiments

As discussed above, disaggregated composable servers in data centers are becoming a reality due to the introduction of Compute Express Link (CXL) technologies in the processor complex. Among other things, CXL-based fabrics enable disaggregated composable servers in data centers to share resources between hosts and servers/targets offering resources. Although CXL-based fabrics offer many advantages, several challenges still remain to be solved to enable disaggregated composable servers in data centers.

One aspect of this application describes techniques for auto-discovering devices and remote CXL devices along with the appliances. Utilizing auto-discovery processes may help hosts and targets (e.g., target workloads) get discovered automatically and help hosts to connect a target efficiently in CXL-ethernet (CXL-E) fabrics. Auto-discovery of a CXL target in CXL fabrics may involve two kinds of the target. One may be multiple logic devices (MLD) local resource and the other may be a virtual MLD resource which is exported from another server to MLD appliance.

In some examples, the decomposable data center may comprise a number of servers, MLD appliances, CXL Ethernet switches, and Ethernet switches. It may be possible to have the functionality of the CXL-E switches and Ethernet switches to be hosted on the same device. In some examples, the decomposable data center may include, among other things: a traditional Ethernet switch/router that supports Layer 2/3 switching and routing functionality; a CXL-E switch that supports CXL and Ethernet domain mappings and policies, and has a CXL Domain Manager that interacts with other CXL-Domain Agents and connects to Low Latency Ethernet network; Persistent Memory appliances supporting multiple servers and that have CXL-Domain Agent, and CXL-E gateway manager among other modules; a CXL-E Translator/NIC that translates CXL frames to Ethernet and vice-versa; a Board Management Controller that terminates IP messages and issues low-level CXL commands over I2C, SMBUS, etc.; a server that has CXL-Domain Agent and baseboard management controller (BMC) among other modules; a Server Composer Manager that, based on user requests, allocates appropriate units of CXL.mem, CPU and GPU resources and issues appropriate instructions to the controller to set up the infrastructure; a server controller that is responsible for ensuring the CXL root hierarchy is satisfied; a CXL-E Controller that is responsible for CXL-device endpoint mapping to MAC addresses and ensures that CXL root hierarchy is resolved accurately; and a Network Controller that runs LLDP and provides connectivity information to other elements, as well as ensures the end-to-end secure associations needed between CXL-E device endpoints are satisfied. The policies to be applied may be divided into two parts: infrastructure and application.

Initially, the CXL-E devices and the CXL-E switches may boot up and exchange LLDP information. This information may be sent over the Network Controller that generates the topology information and performs admission control. This step may be needed to keep rogue devices from accessing the fabric. On a policy application that ensures only certified devices are brought into the network (malicious devices being kept out), IP addresses are assigned to the various devices (see Infrastructure bringup). Furthermore, the CXL-E switches initiates logical bindings to the physical port bindings. The CXL appliances may be able to report the resource pool details, QOS and security capabilities that they are capable of to the CXL-E controller. This enables the fabric to be aware of the resources at its disposal. The server boots up over two phases. In the first phase, only the power domain related to the BMC and CXL compliant units are turned on. These units also undergo the Link Layer Discovery Protocol (LLDP) initializations, admission controls, gets an IP address and requests for CXL devices to bind. The CXL-E controller in conjunction with the server controller, under the instruction of the DSC then instructs the servers with respects to the targets that it needs to bind. There may be a placement algorithm that makes sure that user requirements like low latency network, persistent memory from a MLD device may be allocatable among other things. This may be when the application-based requirement may be used for a placement algorithm to satisfy the various application requests. The algorithms used for this placement can be a simple greedy algorithm or one could use a more predictive algorithm. At this time, based on the policies, the CXL devices, the network connectivity, and their policies are stitched. At the end of this step, the infrastructure policies have all been applied and are ready to be used by the applications.

Finally, the host boots up and the BMC presents the CXL devices and its capabilities. The host may initiate PCIe/CXL enumeration and bind the CXL devices to the appropriate Root Port of the CXL hierarchy. The drivers may then present the various resources (e.g., compute, memory, storage, accelerators, and IO connectivity) towards the applications. Application policies may now be used in conjunction with the infrastructure policies (secure tunnel between application and the database hosted on the remote memory) to ensure that the user requirements are met. In general, (a) the placement algorithm can decide to run the application of servers that support the platinum cores, (b) the application latency requirements translates to no-drop and secure traffic from the server to the remote memory; translates to End Point Groups for ACI as an example, (c) a redundancy policy request can ensure that orchestration scheduling will take a number of other parameters other than traditional server parameters, (d) a storage policy that dictates as to how the data at rest be configured.

At times, it may be necessary to add in additional hardware to satisfy user requirements. This process may be traditionally called a "hot-plug" of a resource. Once the hot added CXL-E device powers up, it exchanges LLDP information with the CXL-E switch. This information may be sent over to the Network Controller that updates the topology information and performs admission control of the newly added CXL-E device. On a policy application that ensures only certified devices are brought into the network, IP addresses may be assigned to the newly added CXL-E device. The other steps are similar to the cold boot-up scenario of the unit. This enables the fabric to be aware of additional resources at its disposal. Once the resource is pulled into the fabric and announced to the DSC, the placement algorithms may use it up on its next run. In some examples, the DSC works with the CXL-E controller and the Network Controllers to satisfy the user policy requirements.

Another challenge with disaggregated composable servers in data centers is that the disaggregation of these data centers is limited to the storage protocols over the network due to inefficiencies caused by higher latencies in accessing remote memories, including persistent memories. As applications demand instant responses to achieve superior performance, it was hardly considered to extend the memory beyond the server. But, with coherent access to the IO devices, CXL has tried to address the latency issues while accessing device backed memories. However, CXL is still not evolved to provide acceptable experience for the remote memories. The CXL, by definition, is restricted to the switch backed devices placed inside the chassis or the server. Ethernet being the de-facto standard for disaggregating the resources, bridging the CXL to ethernet becomes the need of the hour.

However, a major stumbling block in the solution lies the high latencies introduced by the ethernet and those are not acceptable to an application that is accessing low latency devices such as memories and/or persistent memories over the network. Lack of low latencies are going to greatly limit the use cases of disaggregation even in CXL fabric. Especially given that CXL by design doesn't expect the applications to change itself or even the stack to access the device backed memories. Given these constraints, it becomes imperative to find the solutions that can address high latencies of the network infrastructure.

Accordingly, another aspect of this application is directed to techniques for using an application agnostic prefetching mechanism that will hide the latencies of network infrastructure and provide a smooth experience to applications while accessing remote memories and/or persistent memories. The bulk transfer of the data based on the principal of locality may greatly reduce the impact of small packet transfers between hops. Typically, regular workloads access the memory that is contiguous to the page, hence optimizing the page transfers, as described below in more detail, will greatly improve the efficiency and latency of the CXL transfers making the disaggregation of the memories more reasonable. As such, it may be expected that the prefetching mechanism described herein may achieve the performance demanded by a memory sensitive application that is ready to work with device backed memories such as GPU memory, persistent memory devices, and/or the dynamic random-access memory (DRAM) devices.

In some examples, remote CXL devices may be accessed over the network through pre-defined CXL over ethernet protocol. The applications access memory as if it is local to the server and the remoteness of the memory is hidden by the device initiator that hides the presence of the ethernet. However, that introduced extra latency while accessing the device. This device may be more than the CPU local DRAM access latency, causing the applications to starve. Thus, the application experience may be sluggish, essentially defeating the benefits of the disaggregation.

To address the problem described above, the access pattern driven prefetching may need to be designed in the device initiator so that every request of the application may not be sent to the actual device. In some examples, the application may issue a maximum of 64 bytes worth of read/write requests, which needs to be provided in a manner such that the data is being sent from local memory, and thus, the initiator has to record the access regions and cache them locally by prefetching in advance so that requests may be satisfied from the initiator itself instead of actual device located behind remote appliance or another server. Even though the host software requests the access to 64 bytes at a time, device initiator may not forward 64-byte requests to the remote device. 64 byte traffic may have losses and congestion causing retries and eventually reducing the performance and starving the host application. Therefore, the device initiator may use smart prefetching to avoid small packet bursts traffic to the remote device.

The prefetch handling may be different depending upon the type of device, such as, for example, DRAM or persistent memory (PMEM). Prefetching algorithms for accessing both types of the devices are described herein. In some examples, the device initiator may communicate with the controller to establish the connection channel with the appliance and export the remote device to the server via a pre-defined protocol. In some examples, to satisfy the requests locally, the device initiator may implement a page table per virtual device confined to limited entries of the page size configured by the host. For example, if the host page size is 4 KB, then each page table entry may point to the 4 KB data of the remote device. The number of entries per device may be decided based on a maximum number of virtual devices supported per initiator and/or the available DRAM memory on the initiator.

In some examples, when the read/write transaction from the host enters the device initiator, it may first go through an 8-way set associate device cache. If the entry is present in the cache, the request may be serviced from the cache itself. The cache may have bus, device, function (BDF) source address fields for secured access. In some examples, if there is a miss, then the transaction may go through the next level of ternary content-addressable memory (TCAM) and/or static random-access memory (SRAM) region to perform the lookup. This TCAM may be programmed by the software running on the device initiator at the time of enumeration of the devices. The TCAM entry may be per BAR region of the virtual device and may include a base address and size fields along with the BDF for the lookup. The TCAM associated SRAM may also have a local address base that corresponds to page directory in the device's memory.

In some examples, the page directory entry may have reference to the page table that includes the information about the device's currently accessed page regions by the host. The software may pre-populate all the fields above during the initial discovery stage of the virtual device. In some examples, the page directory entry may include a page table base field (e.g., a page table base address in the local memory), a Universally unique identifier (UUID) field provided by the appliance per virtual device during initial discovery, a page table entry (PTE) size field (e.g., a page size per entry), a source MAC (SMAC) address field for the device in communication with the appliance and the controller, a destination MAC (DMAC) address field for the device in communication with the appliance and the controller, a VLAN field (e.g., a VLAN ID for communication), a port field (e.g., a port index), and/or a metadata field (e.g., custom metadata for the device's use such as, for example, a type of the device, etc.).

In some examples, the PTE may have reference to local memory that resembles with the actual memory content in the remote device. The page may be updated depending upon type of device, modification of the contents, and/or the periodic timer at which the sync will be happening with the remote memory location. In some examples, the device initiator software may configure the local memory address, remote address, and/or the host address in the PTE and if it is a match, it may fetch the data from the local memory address with the offset requested by the host and service the request. When there is a miss in the page table, an application-specific integrated circuit (ASIC) may inform the device software via interrupt about the miss and necessary metadata, and the software will then form the request based on the page directory configuration such as source MAC, destination MAC, UUID, host address, and/or remote address. It may fetch the required page by requesting entire 4K data instead of standard CXL request which is typically 64 bytes. After receiving the data, it may update the PTE with the necessary information required.

An example read workflow may include the steps described below. In some examples, when the host issues a read request to a memory location, it has the resource address from the host address point of view. The device initiator may have populated the BAR address advertised by the BIOS in the TCAM. For the very first request, the cache may be a miss, hence the TCAM may be looked upon. If the BDF and the address is hit, then the corresponding page directory base may be fetched from the associated RAM entry to the TCAM entry. The page table base may be extracted from the page directory and it may search through the valid page table entries. In some examples, there may be no address configured in any of the page table entries, hence there may be a miss. The miss may be reported to the software via interrupts. Software may read the metadata associated with the interrupt. The software then may extract the UUID of the device from the page directory, along with the SMAC, DMAC, VLAN, port, etc. provisioned earlier and may form the ethernet request to fetch the remote address. The host address may not be used in the packet, but the associated remote address and the offset may be used since the appliance may only understand the address provisioned by itself. Once the page data is received from the appliance, it may update the page table entry with actual remote address for the offset and the local memory address where the data is copied. Once the table entry is updated, the software may inform the ASIC to service the request issued by host. In some examples, subsequent read/write requests from the page may be serviced directly through the cache or the page table entry that was previously updated.

An example write workflow may include the steps described below. In some examples, write requests issued by host may be handled differently depending upon the type of the device and/or the operation the device is intended to. If the write is issued to the remote DRAM device, then it may not be required to send every write or modified data to the remote device. Instead, after the miss is serviced, all future writes may be stored locally inside the device initiator with the sync required field in the page table entry set. The entry may be evicted from the page table in various ways, such as, for example, when the page table entry is getting full and the least recently used (LRU) algorithm may select the entry that requires the sync, if a periodic time for sync expires (e.g., in the case of persistent memory), and/or if the host loses power (e.g., in the case of persistent memory).

For the DRAM devices, the writes may be synchronized only when the page is getting evicted from the table. Whereas all three conditions (described above) may be applicable for persistent memory devices. The sync may send entire page with the offset and the remote address to the appliance, as mentioned above, to make sure that all host updates are sent to the device to keep the remote device in sync with the local memory updates done by the software.

In some examples, when an MLD device (or appliance) boots, the MLD device may perform link layer discovery protocol (LLDP) discovery and find infra virtual local area network (VLAN) and gateway IP via LLDP type-length-value (TLV). The MLD device may do a dynamic host configuration protocol (DHCP) request to a network controller and get a DHCP IP address, assuming admission control is done by the network controller, to admit the MLD device into CXL-E fabric based on an MLD certificate that is installed. Once the MLD appliance gets its IP address, the MLD appliance may use this IP address and advertise its logical devices (LD), address range(s), and its properties to a CXL-E controller using various messages, for instance. In some examples, attributes in advertised resources may include, for example, a unique device ID (UUID), a memory type (e.g., DDR, SCM, PEM, PMEM, etc.), a size (in terms of gigabytes), a latency (e.g., tolerable normalized latency low/medium/high), and/or an address range (e.g., memory address range).

In some examples, a CXL-E controller may keep a map of LD IDs along with associated properties. In L2 mode, an LD-ID may be mapped to a VLAN and in L3 mode, devices may be mapped to different IP addresses and each LD may have different MAC addresses. In some examples, the CXL-E controller may need admission control to allow some logical devices to be part of a specific CXL-E domain.

In some examples, when a server is booted, the server may do LLDP discovery and find infra VLAN and gateway IP via LLDP TLV, and discovery may happen similarly as described with respect to an MLD device. Once the server has booted up, the server may request a CXL-E controller to get the nearest MLD appliance to export memory. Finding the best nearest MLD appliance may depend on a placement algorithm. Once the CXL-E controller finds the MLD IP address, the CXL-E controller may create a tunnel to the MLD appliance. In some examples, the tunnel may include setting up a VLAN (e.g., 802.1q for L2 mode) for hosts and targets.

In some examples, when a host boots, the BIOS may be kept in standby mode. A CXL-E network interface controller (NIC) may perform LLDP discovery and find infra VLAN and gateway IP via LLDP TLV. An MLD device may perform a DHCP request to a network controller and get DHCP IP address assuming admission control is done by the network controller to admit the host into CXL-E fabric based on the MLD certificate installed.

Once the CXL-E NIC in the host gets the IP address, the CXL-E NIC may then request a resource with matching properties (type, size, latency, etc.) to be bound to the CXL-E controller. The CXL-E controller may match the nearest resource using the placement algorithm and may send the LD information to the CXL-E NIC of the host. Then, the CXL-E NIC may create a tunnel to an MLD appliance to consume LD. Once the tunnel is established, the LD address range may be passed to a baseboard management controller (BMC) via a network controller sideband interface (NC-SI) path and the BMC may pass the address range via advance configuration and power interface (ACPI) to BIOS and host boots and maps the LD address range to the operating system.

Another challenge with the CXL-based fabric is with its current, link-level security. In order for CXL frames to meaningfully access remote persistent memory for the use cases that can support such access, link-level security would be an impediment. Accordingly, another aspect of this disclosure describes an end-to-end security paradigm for enabling a secure end-to-end connection from the server to remote persistent memory communication.

CXL has been defined for a number of devices with varying latency and is broadly divided into CXL.io, CXL.cache, and CXL.memory. In general, it is expected that remote persistent memory (PM) would be feasible if applications can tolerate a latency greater than 250 ns. Remote PM is defined as memory available outside of the chassis to the servers. Access to remote PM may allow for applications to be run with varying memory requirements and the composable framework may allow for it. In general, applications may request tuples of the form [server-cpu, number-of-GPU, persistent memory, and storage].

Given the latency requirements, a remote memory from servers (e.g., UCS servers) and chassis may be accessible. In these scenarios, a CXL-to-Ethernet-translator may be used to encapsulate CXL transactions as payload into Ethernet frames. Support for other servers that use CXL frames and is sent out natively to a switch is also supported. Assuming that in most cases CXL.mem access will be needed in the order of 2 TB/s, it may be expected that the CXL-to-Ethernet translator or a NIC form factor may be needed to generate Ethernet frames from the chassis. This traffic is referred to herein as "CXL-over-Ethernet" or "CXL-E."

CXL has defined link-scope security; hop-by-hop security via the PCI-SIG standards. However, there are no standards for end-to-end security when the CXL frame crosses from the CXL to the Ethernet domain. Given the Ethernet frames from the source to destinations, a multi-hop MACSEC may be used. However, this multi-hop MACSEC may not be on a VXLAN frame format. This disclosure proposes to use a new Ethertype for multi-hop MACSEC. Additionally, this disclosure may enhance the network (APIC) controller to program the appropriate CAK keys and the link between the two CXL-E device endpoints. Once the system has these two capabilities, it may be able to provide end-to-end CXL-E device endpoint security. Note that MACSEC has a data-frame format, and a control MKA protocol. In some instances, the MKA equivalent running in an APIC (network controller) may be re-used for this use case. However, instead of using iVXLAN as the data format for encryption, a new Ethertype may be used and encrypted using Layer-2 Ethernet semantics. The new Ethertype may allow for multi-hop capability through transit nodes.

In order to ensure that additional latency is not imposed to cut-through forwarding while performing security, the CRC in the packet may be stamped so that it is marked bad in case there is a security violation. In some scenarios, a failed security association may also trigger the same.

In some examples, the techniques described above and herein for enabling a secure end-to-end connection from the server to remote persistent memory communication may include (a) defining a new multi-hop Ethertype for MAC-SEC in the data plane, (b) using the control plane to replace the traditional MKA protocol, and (c) in order to not introduce additional latency—have a solution to enable cut through switching. This may allow the system to be able to setup the infrastructure where the communication between the CXL-E endpoints are encrypted. This may occur at the location where CXL to Ethernet conversion takes place in either direction.

Another aspect of this disclosure is directed to applying policies to aid in the deployment of applications on a disaggregated composable server based on the application's requirements for compute, memory, storage, accelerators and IO connectivity. That is, a framework to ensure that policies are applied appropriately at the infrastructure level and at the application level. CXL-E fabrics present a unique opportunity to tie policies across different domains together. The techniques of this disclosure help ensure that applications within a tenant scope are able to access resources only within the domain that it may be enabled. For instance, based on end-user application requests, a data center can be decomposed based on the needs of the user, whether it is running an astrophysics application and/or a machine-learned model for gene sequencing.

Initially, a Disaggregated Composable Server (DCS) Service will be responsible for booting up the infrastructure elements of this fabric. In general, the various controllers (namely, the DCS controller, compute controller, the network controller, and the CXL-E controller) are responsible for admission control of the various devices and gathering capabilities and status of the devices. The DCS controller may be responsible for ensuring that infrastructure policies are applied for a tenant. For example, a tenant may prefer to use only platinum servers, gold-traffic class for network transmission, and have a particular requirement for data redundancy and encryption for data at rest. This may necessitate a need to setup logical policy models to be applied on the concrete policy models across the entire infrastructure. Finally, policies can be applied for applications within a tenant context to ensure that within the disaggregated composable server in the data center, access to the data uses only the resources that are allocated to it.

As an example, a data center provider may support multiple tenants (Company-A, and Company-B) based on their requirements. Setting up these resources may necessitate a policy model that needs to be applied to the infrastructure. Within the boundaries of Company-A, it may be possible to further subdivide the resources based on access requirements (e.g., HR database as opposed to an Engineering code base). Once again, policies may need to be applied not only on the server compute complex, but also on the CXL-E fabric, network, and storage components.

Another aspect of this disclosure is directed to techniques for placement of virtual machines. For context, in today's data center deployments, a lot of research has been done on optimal placement of virtual machines (VMs). This placement is done mostly based on fixed server characteristics. However, in the CXL enabled data center infrastructure, the infrastructure is in itself composable. As a result, application placement takes another dimension where optimal configuration of the infrastructure is paramount in effective use of resources.

A composable infrastructure that is enabled due to the CXL technology allows tailoring resources a workload would need. This disclosure describes techniques for a greedy algorithm that may optimally use resources given the constraints around its placement. Disaggregated composable servers in data centers are becoming a reality due to the introduction of CXL technology in the processor complex. In a nutshell, CXL may be the next generation of PCIe technology and may be backward compatible with legacy PCIe devices. The ability to extend CXL from a server processor complex to access, among other things, remote persistent memory, accelerators purpose built for infrastructure offloads, appliances for storage, and IO requirements has opened door for composable infrastructures. All resources available to the infrastructure controller has domain-labels (customer centric), geo-labels (location centric), and so on for all its resources.

In general, based on application/workload specific requirements, it is possible to group resources from the shared pool to custom create a composable infrastructure for the duration of the application uptime. For instance, a typical data center with multiple rows, that are comprised of racks, which in turn are stacked with servers, accelerators, storage devices, multi-logical remote memory devices, and so on. In today's world, when a VM needs 8 cores of compute with processor speed greater than 200 GHz, 256G RAM with latency of 200 ns, 1 TB storage, GPU-type-X (Tensor-processing) with throughput (50 GB/s), the resource manager looks for a server with those parameters. If such a server exists, the VM request may be served, otherwise the service may be denied. However, in the composable server world, one can build up the infrastructure on demand for the VM to run. This disclosure describes an algorithm associated with building this composable infrastructure based on the constraints of label, and [server-constraint, memory-latency-constraint, accelerator-constraint, storage-constraint, and so on].

In some examples, the application request may be made with a particular domain-label, and the resources tagged with the domain may be eligible in the algorithm flow described below. Also, this can account for affinity or anti-affinity by using affinity-labels with which the resources are mapped. For instance, an anti-affinity label of a geo-label (example ROW1-LABEL), implies that all resources marked with the ROW-1 label cannot be used during this run of the algorithm. As a result, constraints of the type boolean may be used for the resources with the labels attached to them.

In some examples, the controllers may be aware of the resources at their disposal. The algorithm may be initialized by looking at all the servers with compute resources in the free pool. From the servers with compute resources in the free pool it may narrow down the servers that can support the number of cores desired for the application. At the end of this step, the servers may be ordered in terms of the largest utilization assuming that the application would be supported on it. In some instances, if the data center had "X" number of servers, it may be expected that only a number "Y" of them would be eligible (e.g., eliminated by the use of labels, and/or utilization values being too high), and the resultant Y may be ordered based on their utilization. In some examples, weights may be given to the servers based on their utilization. For instance, each eligible Server-i with weight "u" may be determined, where u may be the utilization of the server. For example, if there were 3 servers at the end of this step, S1 may have weight 0.9, whereas S2 may have weight 0.85, and S3 may have weight 0.8.

In some examples, the next step in the algorithm may be to satisfy the memory constraint (STEP-2-MEMORY-LATENCY-CONSTRAINT). For instance, for each of the eligible servers, each server is checked to determine if the DDR, Storage Class Memory, and/or Remote Persistent Memory available to the chassis may be able to satisfy the memory-latency constraint. As a result, the order in which this constraint may be checked may be by evaluating the latency metric to access (a) HBM, (b) local resource like DRAM, (c) remote DRAM over CXL—possibly single hop, (d) pooled DRAM from a CXL compliant device, (e) remote memory from within the rack (likely single hop intra-rack CXL compliant elements), and/or (f) remote memory that may be multiple hops away. Depending on the availability of the memory within the latency constraint imposed by the server, and the underlying CXL compliant network, some of the servers from STEP-1 may be eliminated. Additionally, the remainder of the servers may be weighted with respect to memory-latency range. A normalized value may be obtained by generating a value that may be equal to the most desired value (HBM), divided by all possible values. For instance, memory-type (a) may get a value of 1, whereas constraint supported by memory-type-(f) may get a value of ⅙, with the others in between. Progressing with the example above, S2, may have been eliminated, S1 may have obtained the memory-latency value of ⅙, and S3 a memory-latency value of 1. For each element that needs to be added to composable infrastructure, the value may be normalized for the constraint with each step, accounting for elimination of possibilities.

In some examples, the next steps of the algorithm may be optional and/or if there is need for appropriate GPU-offloads (STEP-3-ACCELERATOR-CONSTRAINT), storage requirements (STEP-4-STORAGE-CONSTRAINT) and so on, a similar process may be applied to obtain normalized values for these elements with the server at its core. If such a constraint is not needed, then a value of 1 may be used for such constraints. This normalized method of adding in constraints and elimination of servers from the previous steps lends the algorithm to be easily extensible for future constraints.

Once the normalized values have been obtained, a weighted average of these normalized values for each server may be determined. In some instances, the final weight given to each server may follow the simple weighted average Server-I=Sum of (Weight-of-Step-constraint*Normalized-Step-Weight), where Weight-of-Step-constraints add up to 1. The Server-I with the highest value obtained may be chosen to host the application with its constraints.

Thus, a simple greedy algorithm that chooses various constraints imposed by a user to figure out the resources that can be accommodated with the server at the center has been described. Once a choice has been made, the resources may be allocated appropriately, CXL connections may be made, and/or CXL-tunnels with appropriate properties, if needed, may be formed to build up the composable infrastructure for the application. Note that the algorithm can be tuned to explore the space for a fixed set of resources at each step to keep it time bounded. However, if the final result does not allow for the constraints to be satisfied, it may be feasible to increase the number of resources to be explored to find a solution.

Yet another challenge associated with disaggregated composable servers in data centers is that there is no mechanism for mapping a virtual channel (VC) specified in the PCIe 5.0/CXL transactions to class of service (CoS) in the Ethernet Frame header or DSCP in IP Header, based upon the memory device being accessed. As such, another aspect of this disclosure is directed to techniques for the application of QoS policies to aid in the deployment of applications on a disaggregated composable server based on the applications requirements for dedicated physical resources (buffering, flow control management, etc.) across the CXL-E hierarchy. This allows for transactions with a higher priority to be mapped to a separate QoS level, eliminating resource conflicts with low priority traffic. Additionally, this ensures that applications within a tenant scope are able to access resources with a differentiated Quality of Service across the CXL fabric.

In some examples, the Virtual Channel (VC) mechanism provides support for carrying traffic that is differentiated using Traffic Class (TC) labels. The foundation for VCs are independent fabric resources (queues/buffers and associated control logic). These resources are used to move information/data across links with fully independent flow control between different VCs. This is key to solving the problem of flow-control induced blocking where a single CXL transaction may create a bottleneck for all CXL transactions within the system. Traffic is associated with VCs by mapping transactions with particular TC label to their corresponding VCs.

In some examples, CXL hierarchies may contain multiple memory types (e.g., DRAM and persistent memory) and/or Multi-Logical-Device (MLD) components. An MLD component can partition its resources into up to 16 isolated Logical Devices. Each Logical Device may be identified by a Logical Device Identifier (LD-ID) in CXL.io and CXL.mem protocols. LD-ID is a 16 bit Logical Device identifier applicable for CXL.io and CXL.mem requests and responses. Each CXL transaction may carry this LD_ID in the transaction layer packets (TLPs). When these CXL TLPs are translated by the CXL-E Gateway devices to be framed as an Ethernet packet, the traffic differentiation labels (VCs) and the differentiated policy for the logical device being accessed (LD_ID) may need to be carried in the Ethernet frame headers to enable differentiated services by the CXL-E fabric infrastructure. The IEEE 802.1Q standard defines a mechanism for tagging the ethernet frames, which enables Quality-of-Service (QoS) prioritization schemes. The logical device (LD_ID) being addressed by the CXL transactions within a VC label shall be mapped to the Priority Code Point (PCP) in the 802.1Q header of the Ethernet frame as per the policy set forth by the CXL-E controller.

In some examples, class of service mapping tables configured by the CXL-E controller based upon end-user policy (see table below) may be used to classify CXL transactions in the CXL-E gateway. In the CXL-E fabric, a three tuple, [MAC_DA, VLAN, PCP] may be used to enable differentiated memory access.

Another challenge associated with disaggregated composable servers in data centers is that the heavy-duty servers present in today's data centers are typically provisioned for futuristic, resource-hungry applications. As such, the hardware resources mapped to such servers generally exceed the requirements of the application deployed on them. However, applications don't always make use of the hardware resources to the capacity. In the process, a lot of expensive hardware resources may be underutilized. This can be a very common issue in a typical data center.

CXL opens up a wide range of opportunities to access remote resources efficiently. The CXL-based fabric enables disaggregated composable servers, where compute, memory, storage, and accelerators are grouped based on application requirements. When the foundational elements are already disaggregated, either as a single logical device (SLD) or as multiple logical devices (MLD), CXL allows for the most efficient use of resources. However, in today's data centers, there is a large server pool whose resources are stranded since they typically are over-provisioned; they have been overprovisioned to ensure that applications would have room to grow. Currently, there is no mechanism available to access the remote resources via CXL, especially from other servers which don't make use of them to the fullest capacity.

Take, for example, memory as a specific resource. With memory, the following issues may arise with the current compute landscape: server memory lies under-utilized most of the time as over provisioning is common practice for future needs; memory demands are increasing but very few applications run 24/7 time there by stranding memory; memory costs typically run between 40-80 of the total server cost; memory failure or upgrade and requires server down time and physical access.

As such, another aspect of this disclosure is directed to solving technical problems associated with situations in which a host may need to access remote resources (e.g., memory), as well as export extra resources for other hosts to consume. This disclosure provides a technical solution for an effective method to export resources from a server to other hosts. For instance, memory BOM is typically the dominant component associated with server cost and can range from 40%-80% of the total server cost. This disclosure makes use of underutilized server resources, such as memory to be shared or leased on demand to a class of servers thereby, reducing the overall TCO. Other benefits of leasing and sharing memory from the peer servers is that memory failure or upgrade downtime are eliminated for the server in need of memory. Also, the techniques of this disclosure help ensure that resources are properly accessed through proper policy.

Disaggregation of latency-sensitive resources of servers in data centers is becoming a reality due to the introduction of CXL technology in the processor complex. CXL has been defined for a number of devices with varying latency and is broadly divided into devices that use a combination of the three protocols specified in CXL, namely, CXL.io, CXL-.Cache, and CXL.Mem. One aspect of this disclosure focuses on how a server can export its own unused resource (e.g., memory) to other hosts to consume. This disclosure also provides a walkthrough of how a remote server is able to consume such resources that have been exported.

In today's deployment, applications that run on platinum servers are generally seen to have a large percentage (close to 50% in some cases) of unused memory. This was done since the server infrastructure needed to scale for a variety of applications, resulting in over-provisioning memory in them. If this memory could be exported such that sliver servers could make use of them, the server infrastructure would likely see a benefit. Although the examples of this disclosure are directed to memory, as an example, it is to be understood that other resources can be exported in a similar fashion.

In some examples, a Server (e.g., BIOS) may be configured to reserve a portion of available memory such that the native OS may not have access to it. A Decomposable Server Controller (DSC) may then make this memory available to a Multi-Logical Device (MLD) appliance that can be one of two types (e.g., physical or virtual). In various examples, the MLD appliance may have (i) local memory of its own, or (ii) may just be a hub to aggregate exported memory from various servers. In order to export the memory from the server to the MLD appliance, a tunnel may be set up with help of the controller. As CXL is an asymmetric coherency protocol, it may not be possible to initiate the transactions from the device to the host memory via CXL.mem by design. Hence, a device may have to access this memory via CXL.Cache protocol. As a result, from the server's perspective, it just exposes a reserved memory and the CXL-compliant device on the server may be responsible for exporting the memory in a secure manner. Note that CXL-compliant device on the server streams out Ethernet frames.

On the other end, the MLD appliance, while booting, may take care of its local logical device (if present), and also create a virtual device for the memory range given by controller. Essentially this virtual device may map to server's exported memory range. Note that this device may be able to map memory that is exported from a variety of servers. Once the virtual device is created, the MLD appliance may create a tunnel to the CXL translator so that it can access host memory via CXL.Cache commands. The MLD appliance in the CXL over Ethernet framework may be able to thus make this memory available to the servers that request it. The MLD appliance may be able to hide the memory that has been exported to it.

In general, accessing the memory that is allocated to a server from a MLD device may remain the same. The memory range may be given to the host (exportee) BMC by the controller. The BMC may provide this range to BIOS of host. The host (Server A) may then create a tunnel to the MLD appliance in order to access memory which is presented as MLD device. It may then use CXL.Mem to access memory as if the memory is part of MLD device locally (Appliance P). In at least one example, every time the host initiates a CXL.Mem request that needs to get a remote device, the MLD appliance may convert the CXL.Mem request to a CXL.Cache request.

In some examples, directly connecting servers may not be a feasible solution, and a requirement for this solution to be effective may be to come up with an algorithm to improve the overall latency for the CXL.Mem command. As the MLD appliance knows an application is accessing certain memory ranges, the MLD appliance can use heuristic algorithm to prefetch the servers memory in a bursty manner to keep data ready for the host to consume. In some examples, the techniques may ensure that stranded resources are available for re-use in the decomposable data center deployments. The techniques use the MLD appliance as CXL.Mem to CXL.Cache gateway and reduces end-to-end latency for better application experience.

By way of example, and not limitation a method according to the techniques described herein for exporting resources from a server to other hosts in a CXL over Ethernet fabric may include establishing a first communication connection between a first server device of a composable data center and a multiple logical device (MLD) appliance of the composable data center, the first communication connection utilized to expose a computing resource of the first server device. In some instances, the computing resource may be a compute resource, memory resource, storage resource, accelerator resource, or the like. In some examples, the MLD appliance may be at least one of a physical MLD appliance (e.g., with its own set of resources) or a virtual MLD appliance.

In some examples, the first server device may reserve a portion of the computing resource such that the portion of the computing resource is rendered inaccessible to an operating system of the first server device. As such, the first server device may determine to expose some or all of the computing resource. In some instances, the first server device may reserve the computing resource or the portion thereof based at least in part on a policy associated with a tenant hosted on the first server device.

In some examples, the MLD appliance may generate a first virtual device that is to be mapped to the computing resource of the first server device. Additionally, in some instances, the first virtual device may be distinguishable from a second virtual device of the MLD appliance, the second virtual device mapped to another computing resource of the first server device, the second server device, or a third server device.

In some examples, the method may also include establishing a second communication connection between a second server device of the composable data center and the MLD appliance, the second communication connection utilized to access the computing resource. That is, the second server device may utilize the shared computing resource of the first server device via the second communication connection, which may be a CXL over ethernet connection.

In some examples, the MLD appliance may receive, from the second server device, a first ethernet frame including one or more compute express link (CXL) packets of a first CXL protocol, the one or more CXL packets indicating a request to access the computing resource. For example, the first CXL protocol may be a CXL.mem protocol.

In examples, responsive to receiving the first ethernet frame, the MLD appliance may convert the one or more CXL packets from the first CXL protocol to a second CXL protocol. In some examples, the second CXL protocol may be a CXL.cache protocol. In some examples, the MLD appliance may send, to the first server device, a second ethernet frame including the one or more CXL packets of the second CXL protocol.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture associated with a data center 100 that may be used to implement various aspects of the technologies described herein. The data center 100 may be representative of a composable data center.

In some examples, the data center 100 may include one or more rack(s) 102, such as the racks 102(1)-102(N) (where N represents any number greater than or equal to one). In examples, each of the racks 102(2)-102(N) may include similar devices and resources as the rack 102(1) shown in FIG. 1. Some of these devices and/or resources can include atop of rack (TOR) ethernet switch 104, any number of servers, such as the servers 106(1) and 106(2), one or more multiple logical device (MLD) appliance(s) 108, which may be either physical or virtual, and/or a CXL over Ethernet (CXL-E) switch 110. Although illustrated as separate devices for simplicity and illustration purposes, it is contemplated that the TOR ethernet switch 104 and the CXL-E switch 110 can be a same switch device in some instances. In such instances, low-latency Ethernet network semantics may be available from the network using QOS.

In some examples, the TOR ethernet switch 104 may support Layer 2 and/or Layer 3 switching and routing functionality. The TOR ethernet switch 104 may connect to the TOR connected Ethernet network 112. In examples, the TOR ethernet switch 104 may connected with other TOR ethernet switches of the racks 102(2)-102(N) via the TOR connected ethernet network 112 to facilitate communications between racks 102, between servers 106, or the like.

In some examples, the servers 106(1) and 106(2) (hereinafter referred to collectively as "servers 106") may include a board management controller (BMC) 114, an Ethernet component 116, a CXL-E domain agent 118, and a CXL-E NIC 120. The BMC 114 of the servers 106 may include functionality to terminate internet protocol (IP) messages and issue low-level CXL commands over I2C, SMBUS, or the like. In some examples, the Ethernet component 116 may connect with the TOR Ethernet switch 104 to facilitate Ethernet communications via the TOR connected Ethernet network 112, as well as between servers. In some examples, the CXL-E domain agent 118 may include functionality to communicate with a CXL-E domain manager 124 to set up CXL-E communications between devices. In some examples, the CXL-E NIC 120 may translate CXL frames to Ethernet frames, and vice-versa, for performing the techniques described herein for enabling a CXL-E fabric. The CXL-E NIC 120 may connect to the CXL-E switch 110 to provide the servers 106 with connectivity to the low latency ethernet network 126, connectivity to MLD appliances 108, and the like.

In some examples, the servers 106 may provide computing resources. Although described as servers/server computers, the servers 106 may comprise any type of networked device, such as servers, switches, routers, hubs, bridges, gateways, modems, repeaters, access points, etc. In various examples, the servers 106 may be standard tower, rackmount, or blade server computers configured appropriately for providing computing resources. In some examples, the servers 106 may provide computing resources including processing resources such as VM instances or hardware computing systems, database clusters, computing clusters, storage clusters, data storage resources, database resources, networking resources, security, packet inspection, memory, containerized applications, and others.

In the example data center 100, the TOR connected ethernet network 112 and/or the low latency Ethernet network 126 may be utilized to interconnect the servers 106 with other servers in the data center 100, such as servers housed in the racks 102(2)-102(N). It should be appreciated that the configuration and network topology described herein has been greatly simplified and that many more computing systems, software components, networks, and networking devices can be utilized to interconnect the various computing systems disclosed herein and to provide the functionality described herein. It should be appreciated that the configuration of the data center 100 described with reference to FIG. 1 is merely illustrative and that other implementations can be utilized.

In some examples, the MLD appliance(s) 108 may be persistent memory appliances that support multiple servers, such as the servers 106(1) and 106(2). In some examples, the MLD appliance(s) 108 may include the CXL-Domain Agent 118, a CXL-E gateway manager component 122, as well as other components or modules.

In some examples, the CXL-E switch 110 may support CXL and Ethernet domain mappings and policies. In some instances, the CXL-E switch 110 may include the CXL Domain Manager 124 that interacts with the CXL-Domain Agents 118 of the servers 106 and MLD appliances 108. The CXL-E switch 110 may connect to a low latency Ethernet network 126 as shown to enable CXL-E communication between CXL enabled devices of the data center 100.

The data center 100 may also include a control plane 128. The control plane 128 may be a control plane over IP. The control plane 128 may include an application infrastructure management component 130, a server composer management component 132, a CXL-E controller 134, a server controller 136, and a network controller 138. In some examples, the server composer management component 132 may allocate appropriate units of CXL.mem, CPU and GPU resources based on user requests, and issue appropriate instructions to the controllers (e.g., the CXL-E controller 134, the server controller 136, and/or the network controller 138) to set up the infrastructure. In some examples, the CXL-E controller 134 may be responsible for CXL-device endpoint mapping to MAC addresses. Additionally, the CXL-E controller 134 may ensure that CXL root hierarchy is resolved accurately. In some examples, the server controller 136 may be responsible for ensuring that the CXL root hierarchy is satisfied. In some examples, the network controller 138 may run LLDP and provide connectivity information to other elements. Additionally, in some instances, the network controller 138 may ensure that any end-to-end secure associations needed between CXL-E device endpoints are satisfied.

FIGS. 2A-2E are a flowchart collectively illustrating a cold-bootup sequence 200 associated with a CXL over Ethernet fabric. In some examples, a disaggregated composable server (DCS) controller 202 may initially be responsible for booting up the infrastructure elements of this fabric. In some examples, the various controllers (e.g., the DCS controller 202, the CXL-E controller 134, the server controller 136, and/or the network controller 138) may be responsible for admission control of the various devices of the data center, and gathering capabilities and statuses of the devices. In some examples, the DCS controller 202 may be responsible for ensuring that infrastructure policies are applied for a tenant. For instance, at operation 210, the DCS controller 202 may send the tenant policies for component placement and connectivity to the CXL-E controller 134, the network controller 138, and the server controller 136) For example, a tenant may prefer to use only platinum servers, gold-traffic class for network transmission, and have a particular requirement for data redundancy and encryption for data at rest. This necessitates to setup logical policy models to be applied on the concrete policy models across the entire infrastructure. Finally, policies can be applied for applications within a tenant context to ensure that within the disaggregated composable server in the data center, access to the data uses only the resources that are allocated to it.

At operation 210, the CXL-E switch(es) 110 of the data center may boot up and initiate LLDP to obtain discovered devices and to identify the topology in the CXL fabric. At operation 212, the CXL-E switch(es) 110 may run a DHCP client. At operation 214, the network controller 138 may determine whether the devices and topology are known. If the devices and topology are known, at operation 216, the network controller 138 may perform admission control for the discovered devices. At operation 218, the server controller 136 may perform admission control.

At operation 220, a CXL-E appliance 204 may boot up and initiate LLDP to discover the CXL-E switch(es) 110. At operation 222, the CXL-E switch(es) 110 may determine whether the devices and topology are known. At operation 224, the CXL-E appliance 204 may determine whether the controller and topology are known.

Figure 2A:
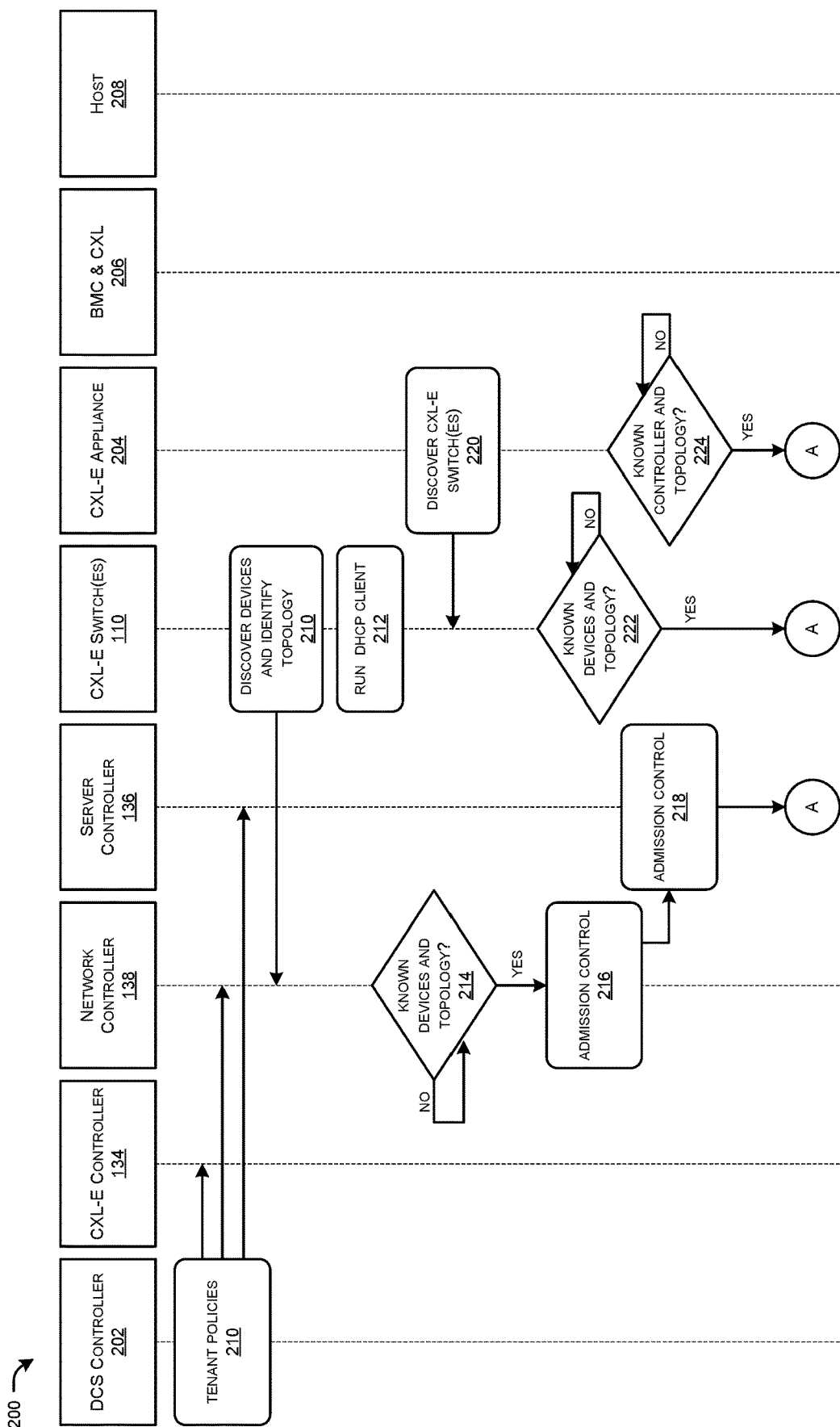
FIGS. 2A-2E are a flowchart collectively illustrating a cold-bootup sequence associated with a CXL over Ethernet fabric.
Figure 2B:
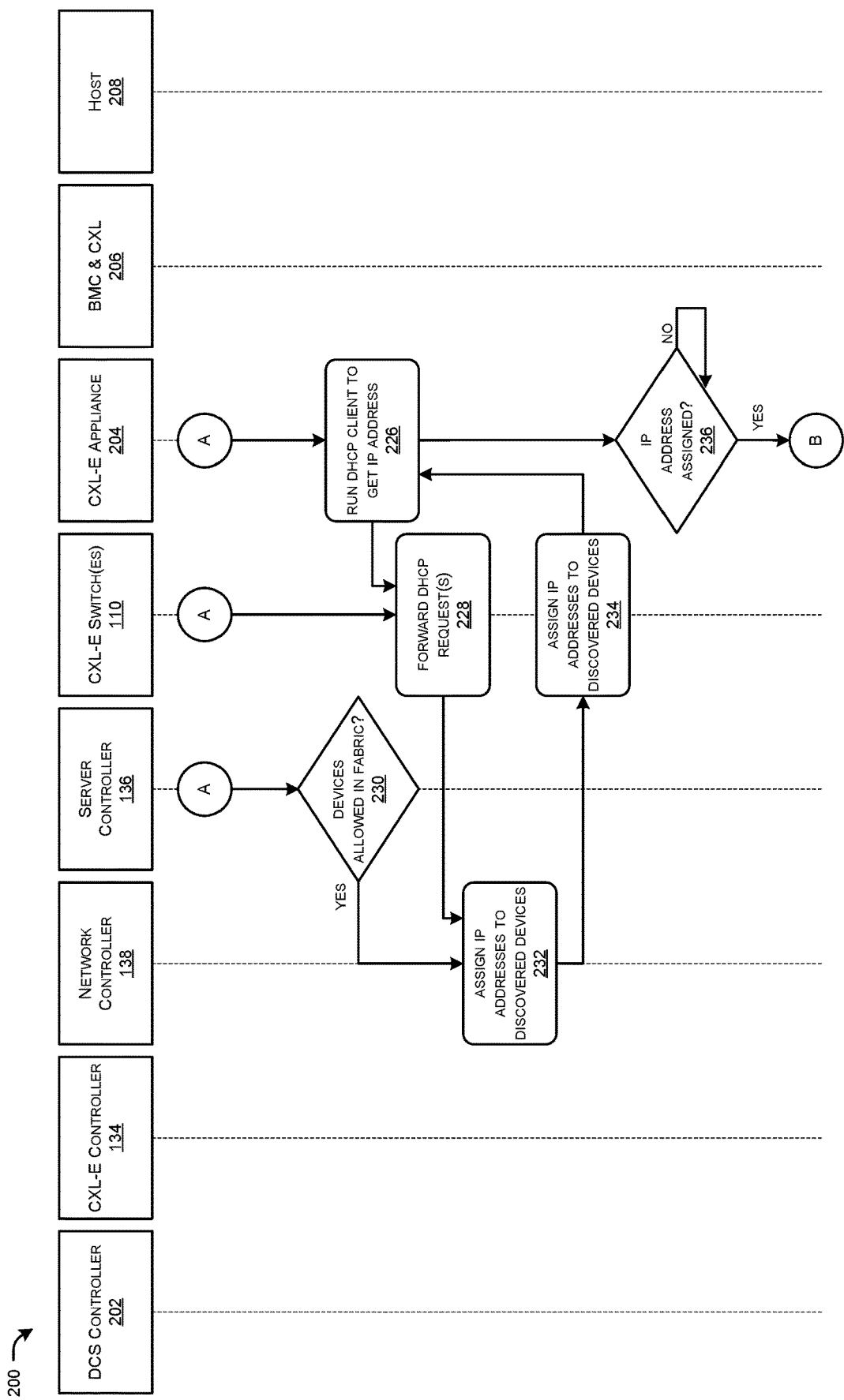

Continuing on to FIG. 2B, at operation 226, the CXL-E appliance 204 may run a DHCP client to obtain/be assigned an IP address. At operation 228, the CXL-E switch(es) 110 may relay or otherwise forward the DHCP request(s) to the network controller 138. If, at operation 230, the server controller 136 determines that the discovered devices are allowed in the fabric, then, at operation 232, the network controller 138 may assign IP addresses to the discovered devices. At operation 234, the CXL-E switch(es) 110 may receive the IP addresses and assign the IP addresses to the discovered devices in the topology. At operation 236, the CXL-E appliance 204 may determine whether an IP address has been assigned.

Figure 2C:
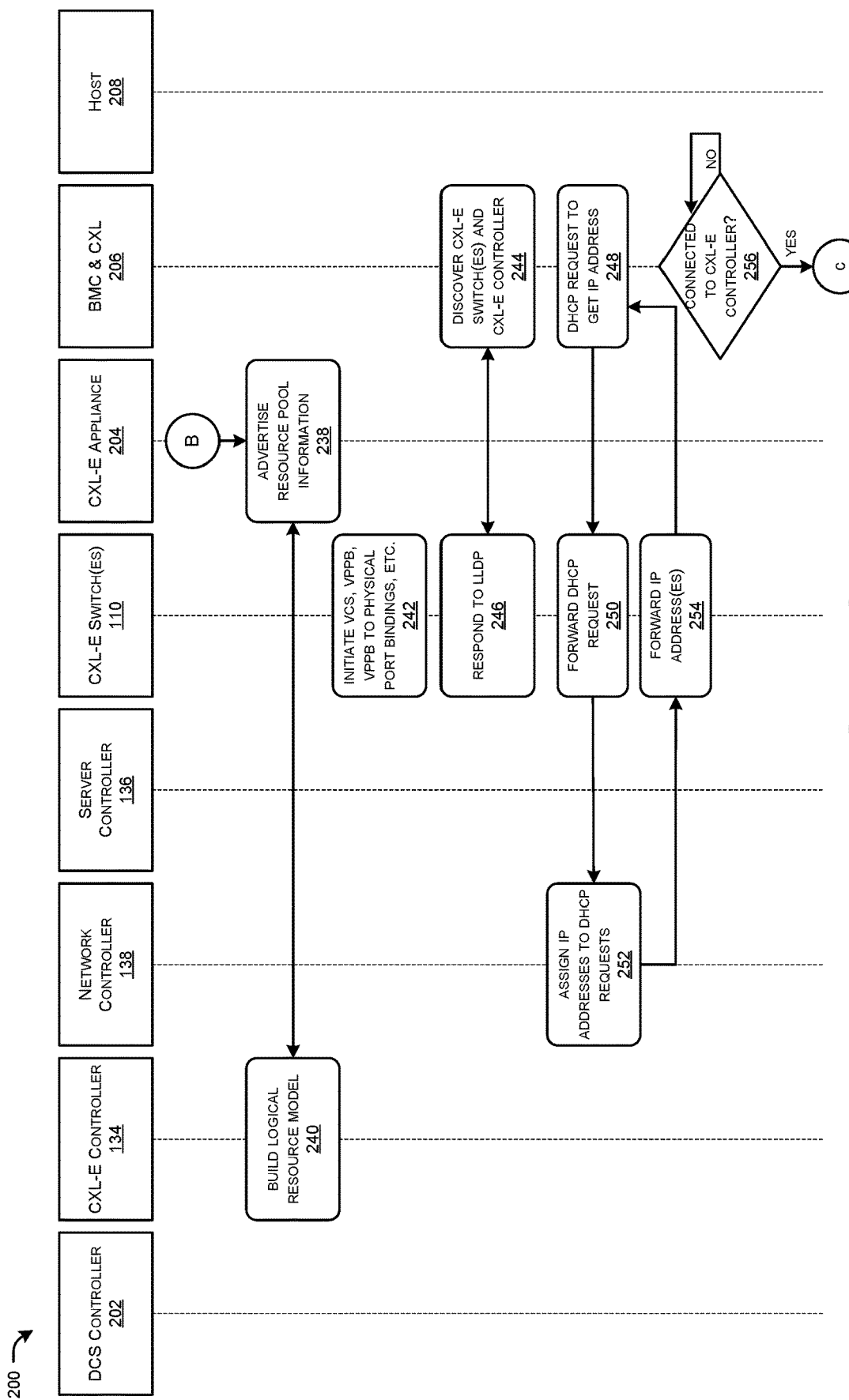

Continuing on to FIG. 2C, at operation 238, the CXL-E appliance 204 may connect to the CXL-E controller 134 and advertise its resource pool details, quality of service (QoS), and/or security capabilities. At operation 240, the CXL-E controller may build a logical resource hierarchy model and gather device attributes and capabilities from the CXL-E appliances in the fabric. At operation 242, the CXL-E switch(es) 110 may initiate Virtual CXL Switch (VCS), Virtual PCI-to-PCI Bridge (vPPB) to physical port bindings, etc. At operation 244, a BMC & CXL compliant unit 206 may power up and initiate LLDP to discover the CXL-E switch(es) 110 and/or the CXL-E controller 134. At operation 246, the CXL-E switch(es) 110 may respond to the LLDP from the BMC & CXL compliant unit 206.

At operation 248, the BMC & CXL compliant unit 206 may send a DHCP request to the CXL-E switch(es) 110 to get/be assigned an IP address. At operation 250, the CXL-E switch(es) 110 may forward the DHCP request to the network controller 138. At operation 252, the network controller 138 may assign IP addresses to the DHCP request(s). At operation 254, the CXL-E switch(es) 110 may relay or otherwise forward the IP address(es) to the BMC & CXL compliant unit 206. At operation 256, the BMC & CXL compliant unit 206 may determine whether connectivity has been established with the CXL-E controller 134.

Figure 2D:
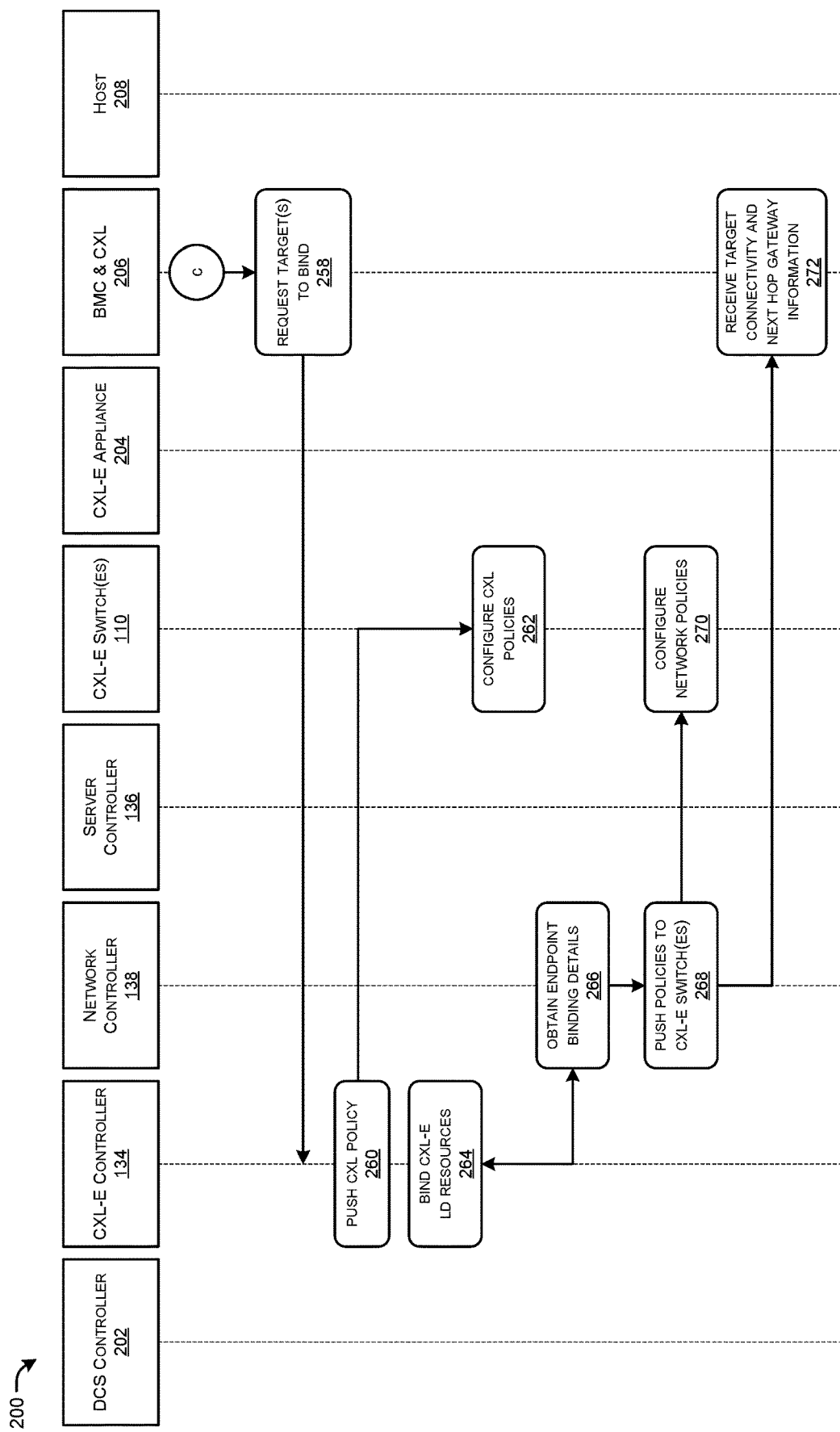

Continuing on to FIG. 2D, at operation 258, the BMC & CXL compliant unit 206 may request to the CXL-E controller 134 for possible targets to bind. At operation 260, the CXL-E controller 134 may push CXL policies to the CXL-E switch(es) 110. At operation 262, the CXL-E switch(es) 110 may configure the CXL policies. At operation 264, based on policy, the CXL-E controller 134 may logically bind CXL-E Logical Device (LD) resources. At operation 266, the network controller 138 may obtain the endpoint binding details from the CXL-E controller 134. At operation 268, the network controller may push network policies (e.g., network access policies, QoS policies, etc.) to the CXL-E switch(es) 110. At operation 270, the CXL-E switch(es) 110 may configure the network policies received from the network controller 138. At operation 272, the BMC & CXL compliant unit 206 may receive target connectivity information and next hop gateway information.

Figure 2E:
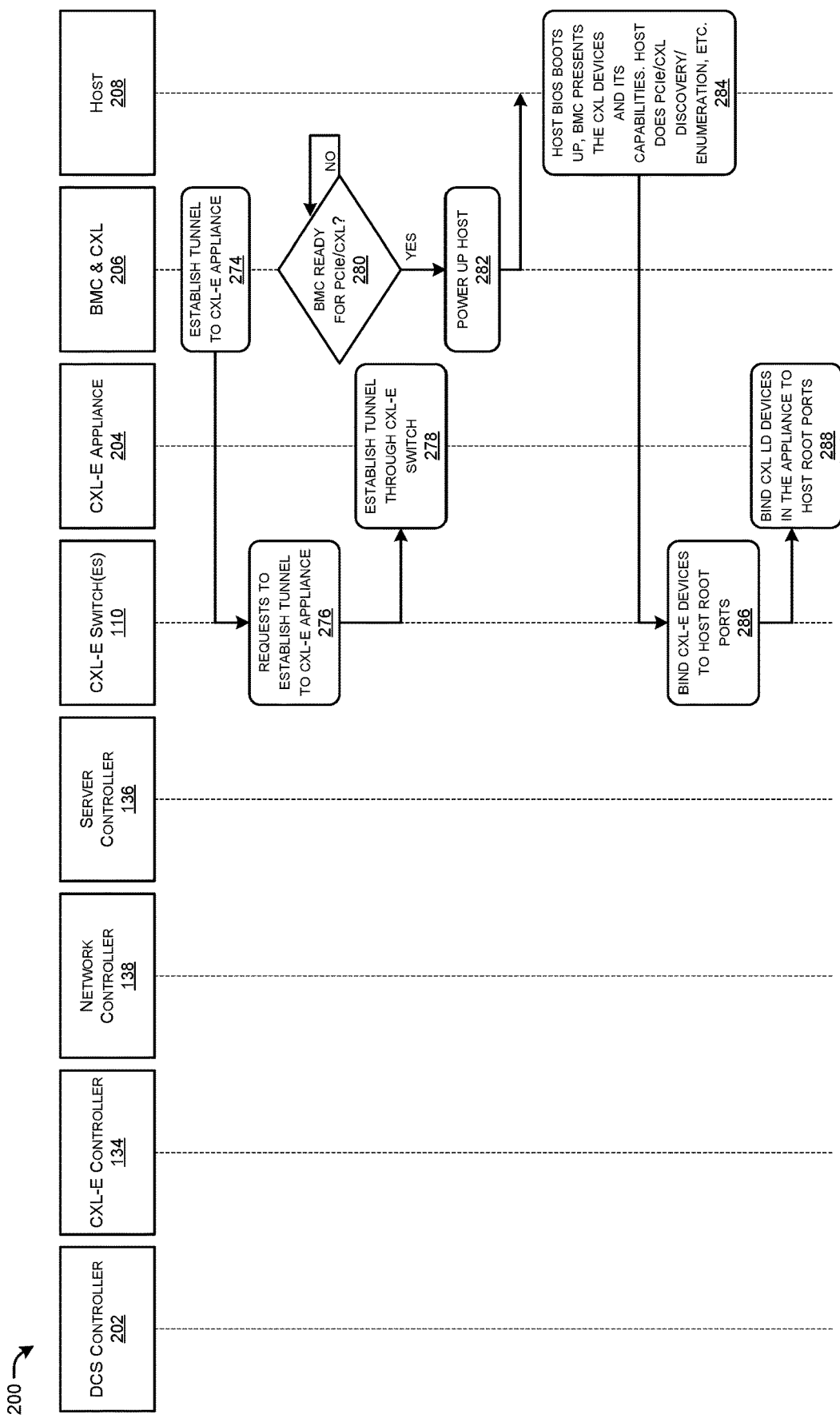

Continuing on to FIG. 2E, at operation 274, the BMC & CXL compliant unit 206 establishes a tunnel to the CXL-E appliance 204 through the CXL-E switch(es) 110. At operation 276, the CXL-E switch(es) 110 requests to establish a network tunnel to the target CXL-E appliance 204. At operation 278, the CXL-E appliance 204 establishes the tunnel with the host ViC through the CXL-E switch(es) 110. At operation 280, the BMC & CXL compliant unit 206 determines whether the BMC is ready for PCIe and/or CXL communication. At operation 282, the BMC & CXL compliant unit 206 powers up the host device 208. At operation 284, the host device's basic input/output system (BIOS) boots up, and the BMC presents the CXL devices and its capabilities. Additionally, at operation 284, the host device 208 does PCIe/CXL discovery/enumeration, etc. At operation 286, the CXL-E switch(es) 110 bind the CXL-E devices in the fabric to the host device 208 root ports. At operation 288, the CXL-E appliance 204 binds the CXL LD devices in the appliance 204 to the host device 208 root ports.

Figure 3:
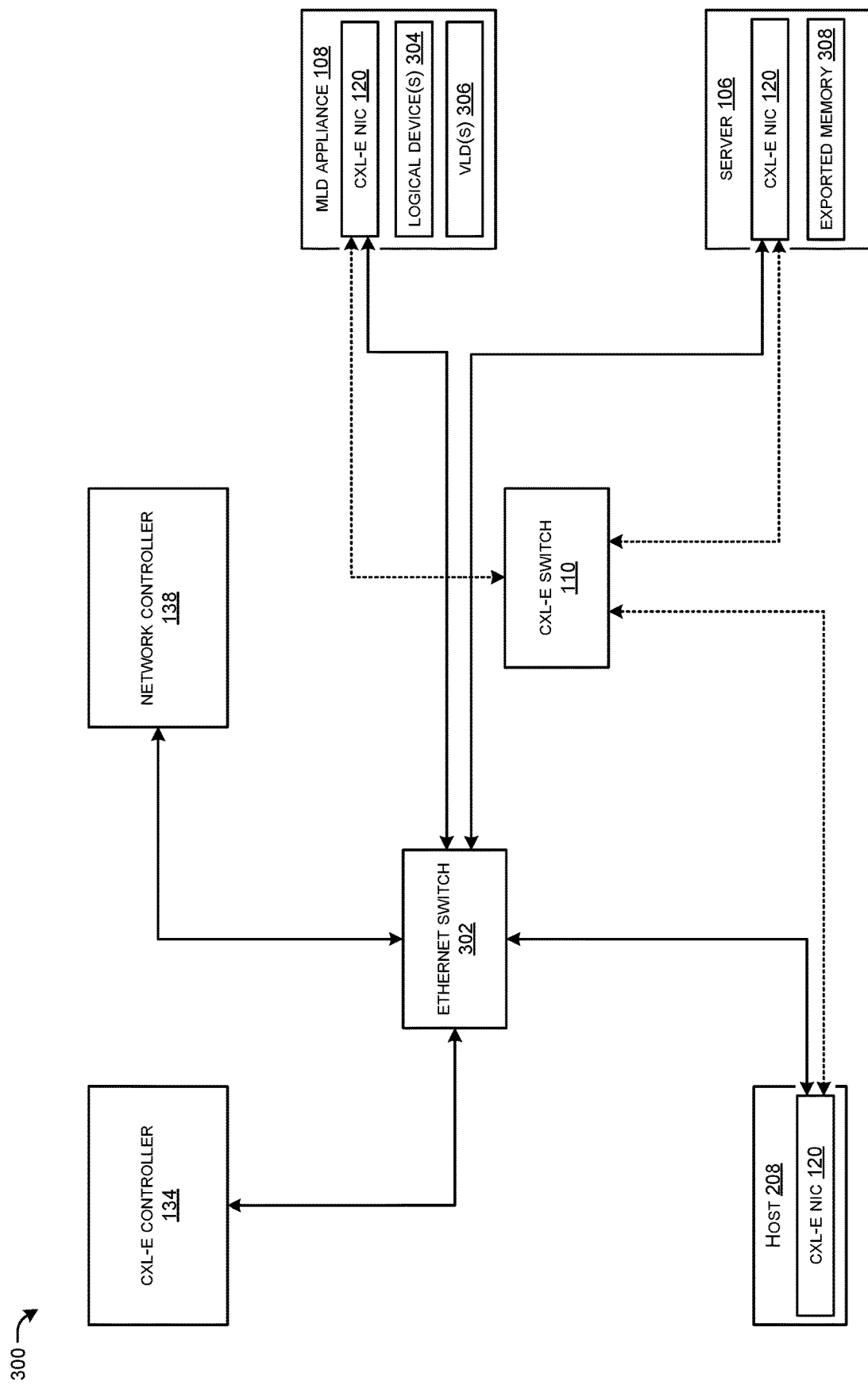
FIG. 3 illustrates an example architecture that may implement various aspects of the technologies described herein.

FIG. 3 illustrates an example architecture 300 that may implement various aspects of the technologies described herein. The architecture 300 illustrates the connectivity between devices of a composable data center, and is simplified with respect to the example data center 100 illustrated in FIG. 1 for ease of understanding. The architecture 300 includes the CXL-E controller 134, the network controller 138, an ethernet switch 302 (which may be similar to the TOR Ethernet switch 104), the CXL-E switch 110, the host device 208, the MLD appliance 108, and a server 106.

As shown, the CXL-E controller 134, the network controller 138, the host device 208, the MLD appliance 108, and the server 106 may be able to communicate with one another over an Ethernet-based protocol via the ethernet switch 302. Additionally, each of the host device 208, the MLD appliance 108, and the server 106 include a CXL-E NIC 120, which may enable CXL-E communications between each of the devices via the CXL-E switch 110.

In some examples, the MLD appliance 108 includes one or more logical device(s) 304 and one or more virtual logical device(s) (VLD(s)) 306. In some examples, the server 106 may also include exported memory 308, which the host device 208 may consume via the MLD appliance 108, as described herein.

Figure 4:
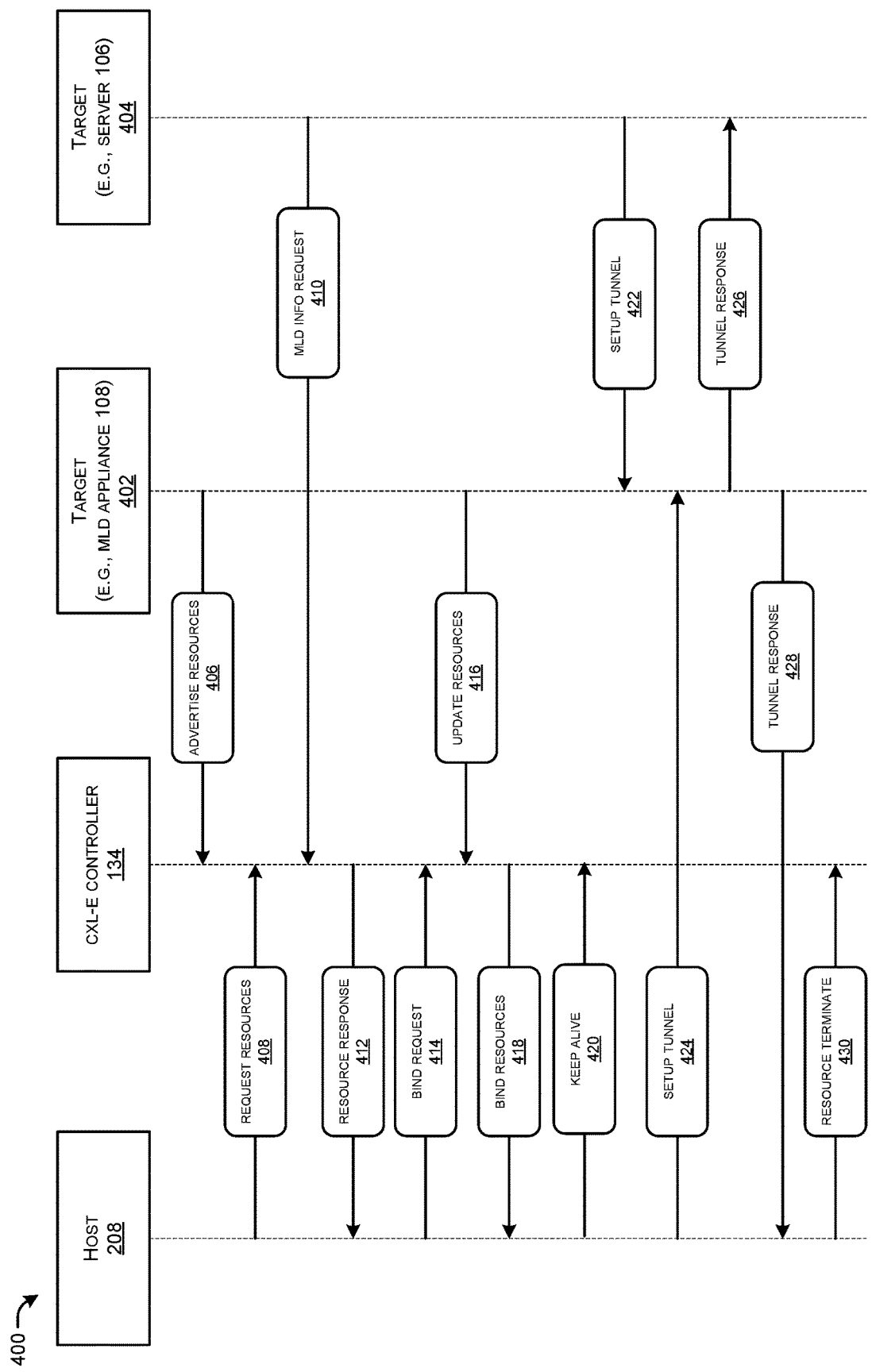
FIG. 4 is a flow diagram illustrating an example auto-discovery sequence associated with establishing connectivity in a CXL over Ethernet fabric.

FIG. 4 is a flow diagram illustrating an example auto-discovery sequence 400 associated with establishing connectivity in a CXL over Ethernet fabric. For purposes of illustration, the auto-discovery sequence 400 will be described with reference to the architecture 300 shown in FIG. 3.

At operation 406, the target 402 (e.g., the MLD appliance 108 of FIG. 3) may advertise its resources to the CXL-E controller 134. For instance, the target 402 may advertise its logical devices address range and its properties to the CXL-E controller 134 using one or more messages. In some examples, the attributes advertised may include the unique device identifier of the target 402, a device or resource type (e.g., High Bandwidth Memory (HBM)/Storage Class Memory (SCM)/Double Data Rate RAM (DDR)/Persistent Memory (PMEM)) associated with the target 402, a size in terms of gigabyte associated with the target 402, a tolerable normalized latency (e.g., low/medium/high, etc.) of the target 402, an address range or memory address range associated with the target 402, and the like.

At operation 408, the host 208 may send a request for resources to the CXL-E controller 134. For instance, the host 208 may request a resource with matching properties (e.g., type, size, latency, etc.) to the CXL-E controller 134. At operation 410, the target 404 (e.g., the server 106 of FIG. 3) may send a request to the CXL-E controller 134 to provide information of a nearest MLD appliance (in this case, the target 402) to export a computing resource (e.g., memory).

At operation 412, the CXL-E controller 134 may send a resource response to the host device 208. For instance, the CXL-E controller 134 may send logical device information to the CXL-E NIC of the host 208, the logical device information may indicate a logical device of an MLD appliance (in this case, target 402) that has the resource. At operation 414, the host 208 may send a bind request to the CXL-E controller. At operation 416, the target 402 may send an indication to the CXL-E controller 134 that its resources have been updated (e.g., indicating that a logical device has been added or removed).

At operation 418, the CXL-E controller 134 may send a bind response message to the host 208, including the necessary information for the host to bind with the target 402. At operation 420, the host 208 may send a keep alive message to the CXL-E controller 134. At operation 422, the target 404 may setup a tunnel to the target 402. The tunnel may be used by the target 404 to export a computing resource to the target 402. At operation 424, the host 208 may setup a tunnel with the target 402. The tunnel may be used by the host 208 to consume a computing resource offered by the target 402. In examples, the tunnels described may be CXL over Ethernet tunnels.

At operation 426, the target 402 may send a tunnel response to the target 404 to finish setting up the tunnel. At operation 428, the target 402 may send a tunnel response to the host 208 to establish the tunnel. At operation 430, the host 208 may send a resource terminate message to the CXL-E controller 134.

Figure 5:
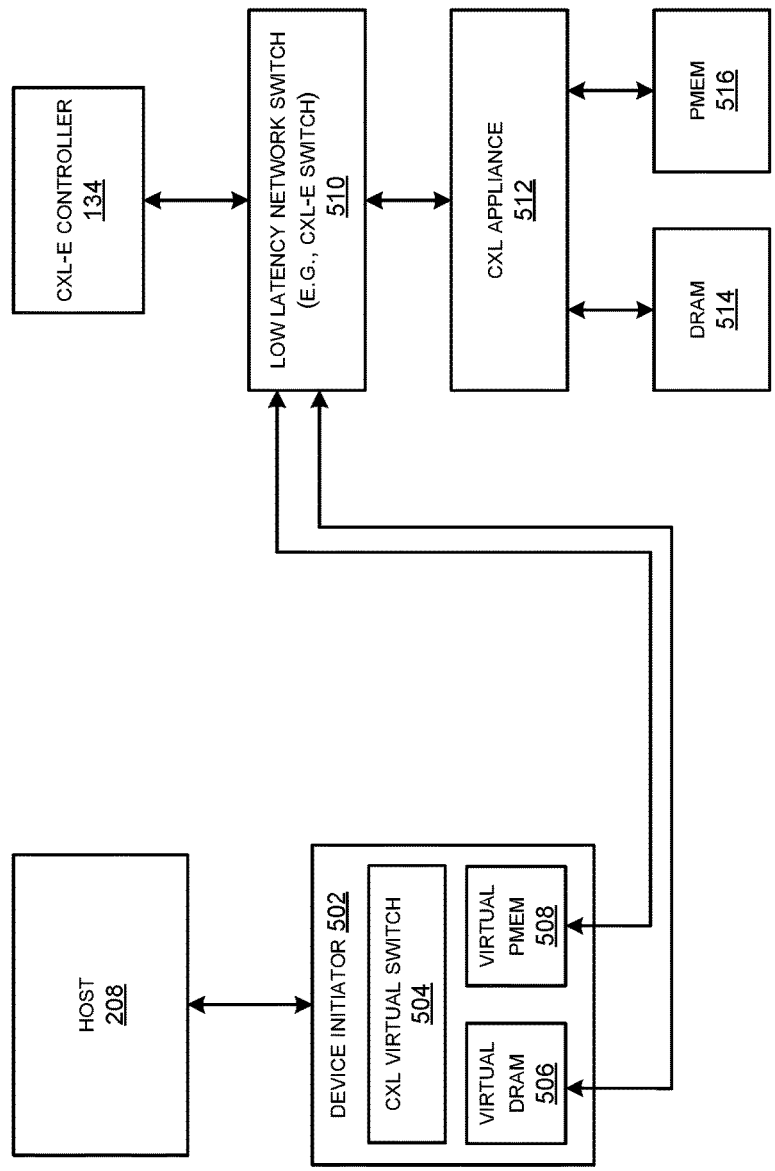
FIG. 5 illustrates a mapping of actual DRAM and PMEM computing resources behind a CXL appliance via a device initiator to a host as virtual DRAM and virtual PMEM computing resources.

FIG. 5 illustrates a mapping 500 of actual DRAM 514 and PMEM 516 computing resources behind a CXL appliance 512 via a device initiator 502 to a host 208 as virtual DRAM 506 and virtual PMEM 508 computing resources. In some examples, the device initiator 502 may communicate with the CXL-E controller 134 to establish the connection channel with the CXL appliance 512 through the low latency network switch 510 and export the remote device to the host 208 via a pre-defined protocol. In some examples, the CXL virtual switch 504 may correspond with the CXL-E NIC 120.

Figure 6:
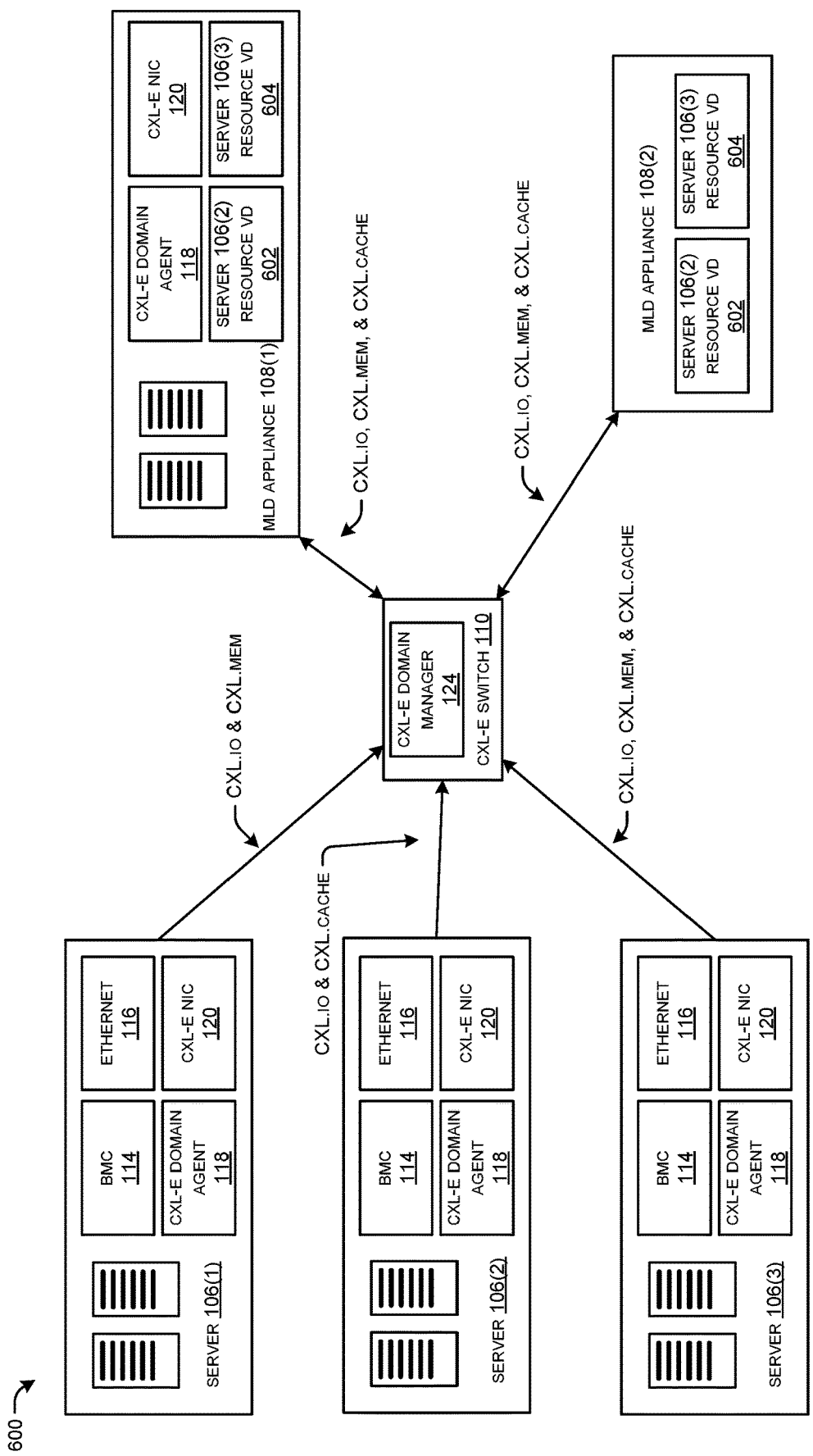
FIG. 6 is a schematic diagram illustrating an example in which server(s) in a CXL over Ethernet fabric may export a computing resource and other server(s) of the CXL over Ethernet fabric may access the exported computing resource.

FIG. 6 is a schematic diagram illustrating an example in which server(s) in a CXL-E fabric 600 may export a computing resource and other server(s) of the CXL-E fabric may access the exported computing resource. Initially, Server 106(2) is configured to reserve a portion of a computing resource (e.g., memory) such that its native OS will not have access to it. In some examples, a Decomposable Server Controller (DSC) may make this computing resource available to one or more MLD appliance(s) 108(1) and 108(2) that can be one of two types as shown in FIG. 6. The MLD appliances 108 may have local memory of their own (e.g., MLD appliance 108(1)), or may just be a virtual hub (e.g., MLD appliance 108(2)) to aggregate exported computing resources from the various servers 106. In order to export the memory from the server 106(2) to the MLD appliances 108, a tunnel is set up with help of the controller. As CXL is asymmetric coherency protocol, it's not possible to initiate the transactions from a consuming device (e.g., server 106(1)) to the target's resource via CXL.mem. Hence, a consuming device has to access this memory via CXL-.Cache protocol. As a result, from the server 106(2) perspective, it just exposes a reserved resource.

On the other end, the MLD appliance(s) 108, while booting, may create virtual devices 602 and 604 that are to be mapped to a server's exported resource. For instance, the virtual device 602 is mapped to the resource of server 106(2) and the virtual device 604 is mapped to the resource of server 106(3).

Once the virtual devices 602 and 604 are created, the MLD appliances 108 would create a tunnel to a CXL-E NIC of the servers 106(2) and 106(3) so that the MLD appliances 108 can access the resources via CXL.Cache commands. The MLD appliances 108 in the CXL over Ethernet framework are able to thus make these resources available to other servers that request it.

In general, accessing a resource that is allocated to a server (e.g., server 106(1)) from the MLD device 108 is possible by the server 106(1) creating a tunnel to the MLD appliance(s) 108 in order to access the resource which is presented as a logical device. The server 106(1) may then use CXL.Mem to access the resource as if the resource is part of the MLD device locally. Every time the server 106(1) initiates a CXL.Mem request that needs to get a remote device, the MLD appliance 108 converts the CXL.Mem request to CXL.Cache request.

Figure 7:
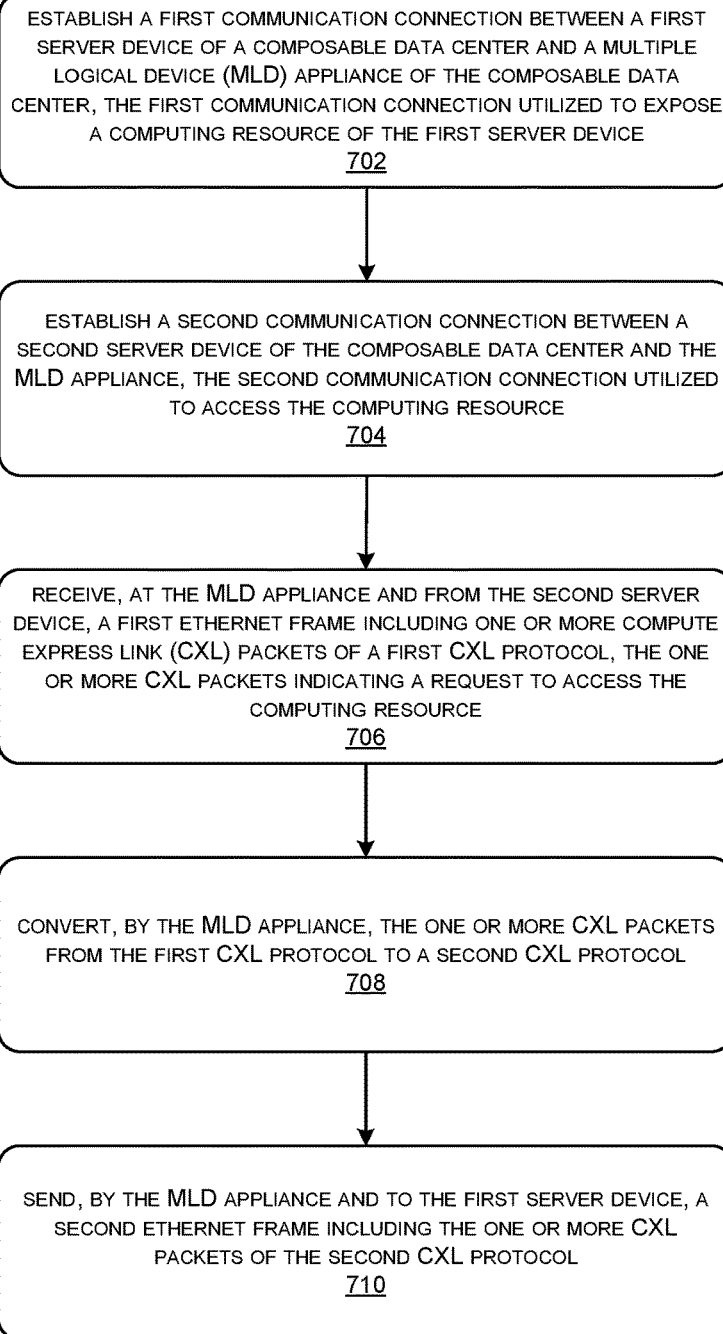
FIG. 7 is a flow diagram illustrating an example method according to the techniques disclosed herein.

FIG. 7 is a flow diagram illustrating an example method 700 according to the techniques described herein. The logical operations described herein with respect to FIG. 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 700 begins at operation 702, which includes establishing a first communication connection between a first server device of a composable data center and a multiple logical device (MLD) appliance of the composable data center, the first communication connection utilized to expose a computing resource of the first server device.

At operation 704, the method 700 includes establishing a second communication connection between a second server device of the composable data center and the MLD appliance, the second communication connection utilized to access the computing resource. At operation 706, the method 700 includes receiving, at the MLD appliance and from the second server device, a first ethernet frame including one or more compute express link (CXL) packets of a first CXL protocol, the one or more CXL packets indicating a request to access the computing resource.

At operation 708, the method 700 includes converting, by the MLD appliance, the one or more CXL packets from the first CXL protocol to a second CXL protocol. At operation 710, the method 700 includes sending, by the MLD appliance and to the first server device, a second ethernet frame including the one or more CXL packets of the second CXL protocol.

Figure 8:
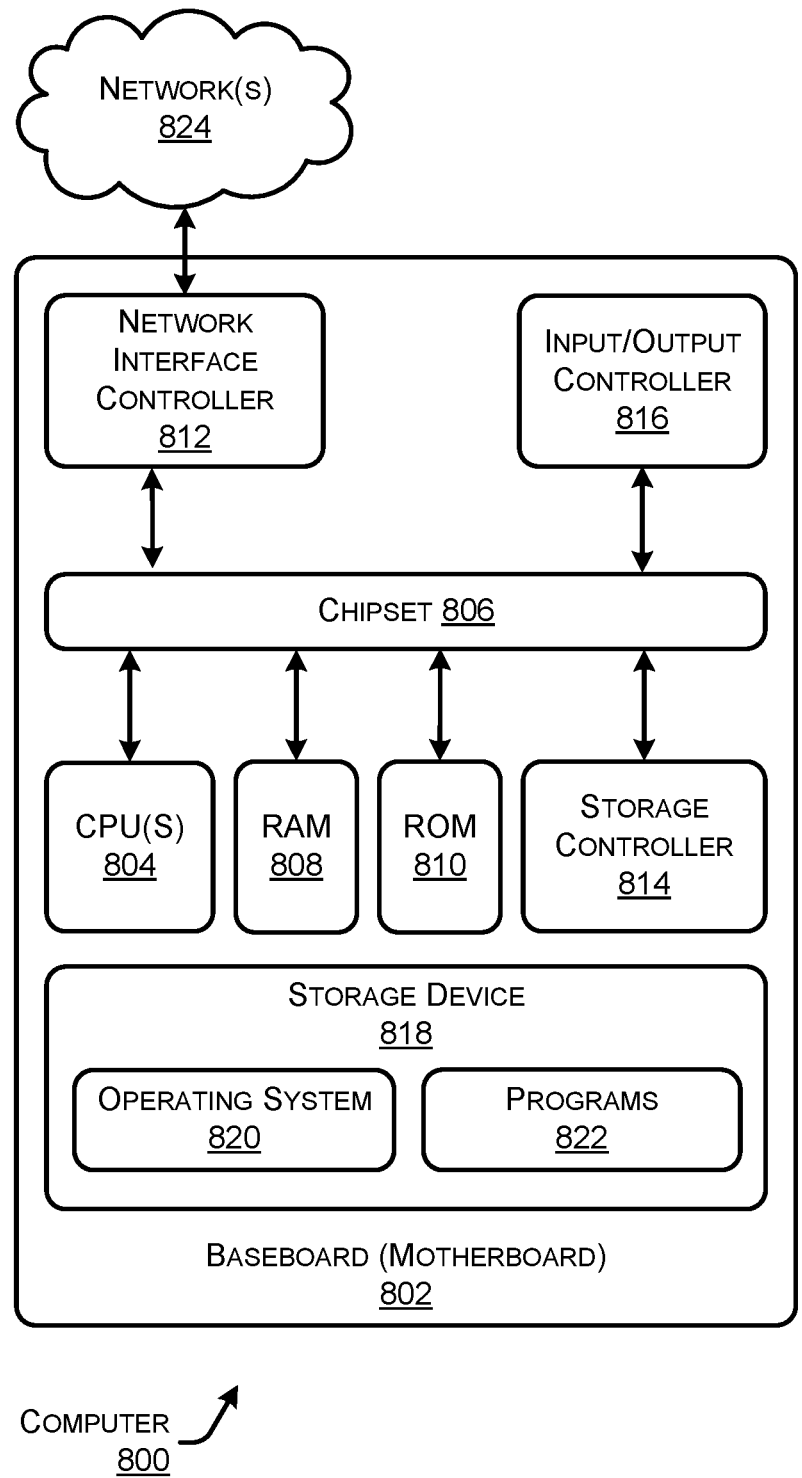
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture for implementing a computing device that can be utilized to implement aspects of the various technologies presented herein. The computer architecture shown in FIG. 8 illustrates a conventional server computer, multiple logical device (MLD), router, workstation, desktop computer, laptop, tablet, network appliance, e-reader, smartphone, load balancer, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network. The chipset 806 can include functionality for providing network connectivity through a NIC 812, such as a gigabit Ethernet adapter. The NIC 812 is capable of connecting the computer 800 to other computing devices over the network 824. It should be appreciated that multiple NICs 812 can be present in the computer 800, connecting the computer to other types of networks and remote computer systems. In some examples, the NIC 812 may be configured to perform at least some of the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the composable data center 100 and or any components included therein, may be supported by one or more devices similar to computer 800. Stated otherwise, some or all of the operations performed by the composable data center 100, and or any components included therein, may be performed by one or more computer devices 800 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes and functionality described above with regard to FIGS. 1-7, and herein. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors (processors) configured to execute one or more stored instructions. The processor(s) may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for establishing a CXL over Ethernet based fabric in a composable data center that includes disaggregated, composable servers.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, from a first server device, a request to bind the first server device with a multiple logical device (MLD) appliance;
receiving, from the MLD appliance through an auto-discovery sequence, information about one or more attributes of the MLD appliance;
selecting, from among multiple MLD appliances, the MLD appliance for binding with the first server device, the selecting based at least in part on the information about the one or more attributes of the MLD appliance received through the auto-discovery sequence;
binding the first server device with the MLD appliance using a compute express link (CXL) over ethernet (CXL-E) protocol, the first server device to export a computing resource to the MLD appliance for utilization by a second server device; and
binding the second server device with the MLD appliance using the CXL-E protocol.

2. The method of claim 1, wherein the second server device utilizes the computing resource exported to the MLD appliance by the first server device.

3. The method of claim 2, wherein binding the second server device with the MLD appliance is based at least in part on the information about the one or more attributes of the MLD appliance received through the auto-discovery sequence.

4. The method of claim 1, wherein the information about the one or more attributes of the MLD appliance received through the auto-discovery sequence comprises an indication that the MLD appliance is a topologically nearest MLD appliance to the first server device.

5. The method of claim 1, further comprising:
receiving, from the MLD appliance, an indication that the computing resource is available to be exported to other server devices;
receiving, from the second server device, a request for the computing resource; and
selecting the MLD appliance for binding with the second server device for providing the computing resource.

6. The method of claim 5, wherein the request for the computing resource comprises a request for an amount of the computing resource, and wherein the information about the one or more attributes of the MLD appliance comprises the amount of the computing resource available through the MLD appliance.

7. The method of claim 1, wherein the computing resource exported by the first server device comprises at least one of memory, processing, or compute.

8. A system comprising:
one or more processors; and
one or more non-transitory computer-readable media storing instructions that, when executed, cause the one or more processors to perform operations comprising:
receiving, from a first server device, a request to bind the first server device with a multiple logical device (MLD) appliance;
receiving, from the MLD appliance through an auto-discovery sequence, information about one or more attributes of the MLD appliance;
selecting, from among multiple MLD appliances, the MLD appliance for binding with the first server device, the selecting based at least in part on the information about the one or more attributes of the MLD appliance received through the auto-discovery sequence;
binding the first server device with the MLD appliance using a compute express link (CXL) over ethernet (CXL-E) protocol, the first server device to export a computing resource to the MLD appliance for utilization by a second server device; and
binding the second server device with the MLD appliance using the CXL-E protocol.

9. The system of claim 8, wherein the second server device utilizes the computing resource exported to the MLD appliance by the first server device.

10. The system of claim 9, wherein binding the second server device with the MLD appliance is based at least in part on the information about the one or more attributes of the MLD appliance received through the auto-discovery sequence.

11. The system of claim 8, wherein the information about the one or more attributes of the MLD appliance received through the auto-discovery sequence comprises an indication that the MLD appliance is a topologically nearest MLD appliance to the first server device.

12. The system of claim 8, the operations further comprising:
receiving, from the MLD appliance, an indication that the computing resource is available to be exported to other server devices;
receiving, from the second server device, a request for the computing resource; and
selecting the MLD appliance for binding with the second server device for providing the computing resource.

13. The system of claim 12, wherein the request for the computing resource comprises a request for an amount of the computing resource, and wherein the information about the one or more attributes of the MLD appliance comprises the amount of the computing resource available through the MLD appliance.

14. The system of claim 8, wherein the computing resource exported by the first server device comprises at least one of memory, processing, or compute.

15. One or more non-transitory computer-readable media storing instructions that, when executed, cause one or more processors to perform operations comprising:
receiving, from a first server device, a request to bind the first server device with a multiple logical device (MLD) appliance;
receiving, from the MLD appliance through an auto-discovery sequence, information about one or more attributes of the MLD appliance;
selecting, from among multiple MLD appliances, the MLD appliance for binding with the first server device, the selecting based at least in part on the information about the one or more attributes of the MLD appliance received through the auto-discovery sequence;
binding the first server device with the MLD appliance using a compute express link (CXL) over ethernet (CXL-E) protocol, the first server device to export a computing resource to the MLD appliance for utilization by a second server device; and
binding the second server device with the MLD appliance using the CXL-E protocol.

16. The one or more non-transitory computer-readable media of claim 15, wherein the second server device utilizes the computing resource exported to the MLD appliance by the first server device.

17. The one or more non-transitory computer-readable media of claim 16, wherein binding the second server device with the MLD appliance is based at least in part on the information about the one or more attributes of the MLD appliance received through the auto-discovery sequence.

18. The one or more non-transitory computer-readable media of claim 15, wherein the information about the one or more attributes of the MLD appliance received through the auto-discovery sequence comprises an indication that the MLD appliance is a topologically nearest MLD appliance to the first server device.

19. The one or more non-transitory computer-readable media of claim 15, the operations further comprising:
   receiving, from the MLD appliance, an indication that the computing resource is available to be exported to other server devices;
   receiving, from the second server device, a request for the computing resource; and
   selecting the MLD appliance for binding with the second server device for providing the computing resource.

20. The one or more non-transitory computer-readable media of claim 19, wherein the request for the computing resource comprises a request for an amount of the computing resource, and wherein the information about the one or more attributes of the MLD appliance comprises the amount of the computing resource available through the MLD appliance.

\* \* \* \* \*